(12) United States Patent
Passeri et al.

(10) Patent No.: US 10,277,671 B2
(45) Date of Patent: Apr. 30, 2019

(54) AUTOMATIC MULTI-HOST DISCOVERY IN A FLOW-ENABLED SYSTEM

(71) Applicant: Logitech Europe S.A., Lausanne (CH)

(72) Inventors: Paolo Passeri, Curitiba (BR); Rajesh Gopalakrishna, Fremont, CA (US); Lapyan Larry Ng, Saratoga, CA (US); Jean-Christophe Hemes, Grandson (CH); Jiri Holzbecher, Binningen (CH); Philippe Chazot, Saint-Jorioz (FR); Tanvi K. Shah, Fremont, CA (US)

(73) Assignee: Logitech Europe S.A., Lausanne (CH)

( * ) Notice: Subject to any disclaimer, the term of this patent is extended or adjusted under 35 U.S.C. 154(b) by 212 days.

(21) Appl. No.: 15/226,792

(22) Filed: Aug. 2, 2016

(65) Prior Publication Data
US 2017/0353549 A1 Dec. 7, 2017

Related U.S. Application Data

(60) Provisional application No. 62/345,744, filed on Jun. 3, 2016.

(51) Int. Cl.
*G06F 15/16* (2006.01)
*H04L 29/08* (2006.01)
(Continued)

(52) U.S. Cl.
CPC ........ *H04L 67/1091* (2013.01); *G06F 1/1698* (2013.01); *G06F 3/023* (2013.01);
(Continued)

(58) Field of Classification Search
CPC ........... H04L 67/1091; H04L 67/1068; H04W 76/14; H04W 76/40; H04W 4/80;
(Continued)

(56) References Cited

U.S. PATENT DOCUMENTS 6,295,051 B1 9/2001 Kanevsky et al.
6,633,905 B1 * 10/2003 Anderson ................ G06F 1/26
709/219
(Continued)

FOREIGN PATENT DOCUMENTS

CN 107463517 A 12/2017
CN 107463518 A 12/2017
(Continued)

OTHER PUBLICATIONS

Final Office Action dated Nov. 1, 2018 for U.S. Appl. No. 15/226,770, 22 pages.
(Continued)

*Primary Examiner* — Jonathan A Bui
(74) *Attorney, Agent, or Firm* — Kilpatrick Townsend & Stockton LLP

(57) ABSTRACT

A computer-implemented method includes sending a broadcast over a network requesting a response from other host computers on the network that are also communicatively paired with the input device, receiving a broadcasted response from a second host computer on the network indicating that it is communicatively paired with the input device, establishing a communicative connection with the second host computer via the network and automatically reestablishing the connection with the second host computer when the second host computer disconnects and reconnects to the network. In response to an edge-detect event, sending a control signal to switch the communicative pairing of the input device from the first host computer to the second host computer.

20 Claims, 22 Drawing Sheets

(51) Int. Cl.

| | | |
|---|---|---|
| *G06F 3/023* | (2006.01) | |
| *G06F 1/16* | (2006.01) | |
| *G06F 3/038* | (2013.01) | |
| *H04W 4/80* | (2018.01) | |
| *H04W 76/40* | (2018.01) | |
| *H04W 76/14* | (2018.01) | |
| *G06F 3/14* | (2006.01) | |
| *G09G 5/08* | (2006.01) | |
| *H04W 4/06* | (2009.01) | |

(52) U.S. Cl.
CPC ............ *G06F 3/0231* (2013.01); *G06F 3/038* (2013.01); *H04L 67/1068* (2013.01); *H04W 4/80* (2018.02); *H04W 76/14* (2018.02); *H04W 76/40* (2018.02); *G06F 3/1446* (2013.01); *G06F 2203/0383* (2013.01); *G06F 2203/0384* (2013.01); *G09G 5/08* (2013.01); *H04W 4/06* (2013.01)

(58) Field of Classification Search
CPC ...... G06F 1/1698; G06F 3/023; G06F 3/0231; G06F 3/038
See application file for complete search history.

(56) References Cited

U.S. PATENT DOCUMENTS

| | | | | |
|---|---|---|---|---|
| 9,225,611 | B1* | 12/2015 | Bagrinovskiy | ........... G06F 9/00 |
| 9,780,115 | B2 | 10/2017 | Tang et al. | |
| 9,870,115 | B2 | 1/2018 | Louch et al. | |
| 2002/0105553 | A1* | 8/2002 | Segre | ....... G06F 3/023 |
| | | | | 715/862 |
| 2004/0215815 | A1* | 10/2004 | Rekimoto | ....... H04L 67/14 |
| | | | | 709/236 |
| 2005/0190148 | A1 | 9/2005 | Fujita et al. | |
| 2006/0244724 | A1* | 11/2006 | Erickson | ........ G06F 3/038 |
| | | | | 345/163 |
| 2008/0056570 | A1 | 3/2008 | Williams et al. | |
| 2009/0102798 | A1 | 4/2009 | Fujita et al. | |
| 2010/0060571 | A1 | 3/2010 | Chen et al. | |
| 2010/0180055 | A1 | 7/2010 | Lyon et al. | |
| 2010/0306424 | A1* | 12/2010 | Akester | ....... G06F 3/023 |
| | | | | 710/36 |
| 2011/0080342 | A1 | 4/2011 | Haren | |
| 2011/0131520 | A1 | 6/2011 | Al-Shaykh et al. | |
| 2012/0083208 | A1* | 4/2012 | Giles | ....... G06F 13/387 |
| | | | | 455/41.2 |
| 2012/0278727 | A1 | 11/2012 | Ananthakrishnan et al. | |
| 2014/0002361 | A1 | 1/2014 | Ballard et al. | |
| 2014/0019652 | A1* | 1/2014 | Soffer | ....... G06F 21/83 |
| | | | | 710/73 |
| 2014/0125575 | A1* | 5/2014 | Samanta Singhar | ... G06F 3/005 |
| | | | | 345/156 |
| 2014/0317530 | A1* | 10/2014 | Chang | ........ H04M 1/7253 |
| | | | | 715/748 |
| 2015/0356045 | A1 | 12/2015 | Soffer | |
| 2016/0110302 | A1 | 4/2016 | Chazot et al. | |
| 2017/0351396 | A1 | 12/2017 | Passeri et al. | |
| 2017/0351471 | A1 | 12/2017 | Passeri et al. | |
| 2017/0351629 | A1 | 12/2017 | Passeri et al. | |

FOREIGN PATENT DOCUMENTS

| | | |
|---|---|---|
| DE | 102017112043 A1 | 12/2017 |
| DE | 102017112044 A1 | 12/2017 |

OTHER PUBLICATIONS

Non-Final Office Action dated Apr. 5, 2018 for U.S. Appl. No. 15/226,770, 20 pages.
Non-Final Office Action dated Jun. 14, 2018 for U.S. Appl. No. 15/226,774, 17 pages.
Non Final Office Action dated May 16, 2018 for U.S. Appl. No. 15/226,803, 17 pages.
Non Final Office Action dated Apr. 5, 2018 for U.S. Appl. No. 15/226,788, 16 pages.
Final Office Action for U.S. Appl. No. 15/226,774 dated Jan. 11, 2019, 20 pages.
Final Office Action for U.S. Appl. No. 15/226,803 dated Dec. 13, 2018, 19 pages.

* cited by examiner

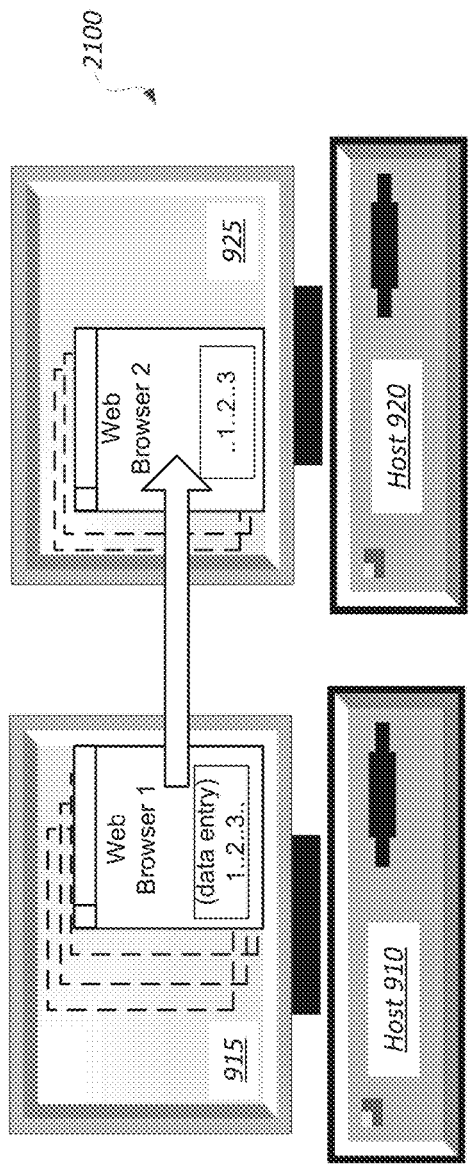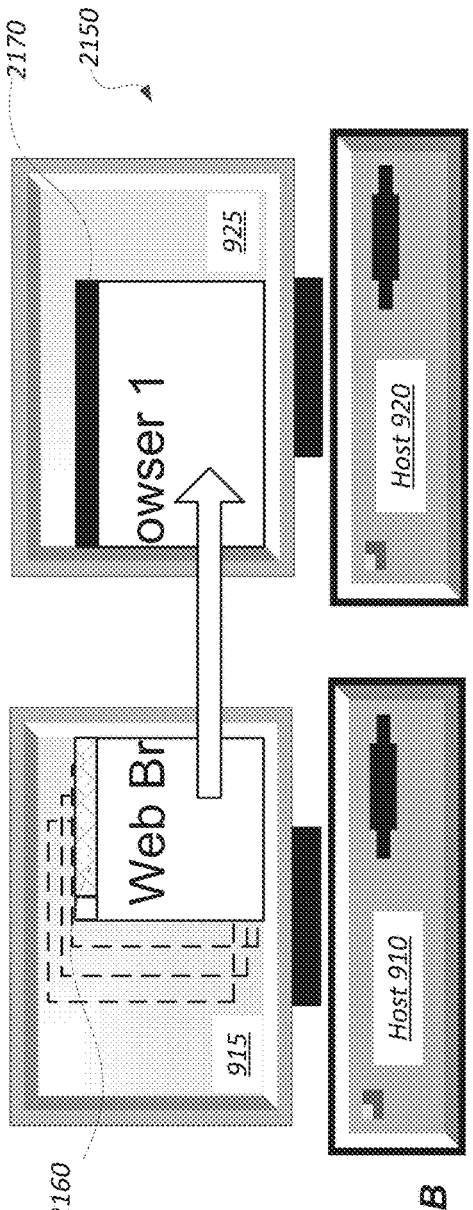
FIG. 21A
FIG. 21B

AUTOMATIC MULTI-HOST DISCOVERY IN A FLOW-ENABLED SYSTEM

CROSS-REFERENCES TO RELATED APPLICATIONS

This application is a non-provisional application and claims the benefit and priority of U.S. Provisional Application No. 62/345,744, filed on Jun. 3, 2016, and titled "Automatic Multi-Host Switching for an Input Device," which is hereby incorporated by reference in its entirety for all purposes.

The following regular U.S. patent applications (including this one) are being filed concurrently, and the entire disclosure of the other applications are incorporated by reference into this application for all purposes:

Application Ser. No. 15/226,770, filed Jul. 29, 2016, entitled "AUTOMATIC MULTI-HOST SWITCHING FOR AN INPUT DEVICE";

Application Ser. No. 15/226,774, filed Jul. 29, 2016, entitled "AUTOMATIC MULTI-HOST SWITCHING FOR MULTIPLE INPUT DEVICES";

Application Ser. No. 15/226,803, filed Jul. 29, 2016, entitled "AUTOMATIC APPLICATION LAUNCHING IN A MULTI-HOST FLOW-ENABLED SYSTEM"; and Application Ser. No. 15/226,788, filed Jul. 29, 2016, entitled "AUTOMATIC DATA TRANSFER IN A MULTI-HOST FLOW-ENABLED SYSTEM".

BACKGROUND

Personal computers (PCs), tablet computers, laptop computers, smart phones, etc., (i.e., "computing devices") are commonplace in modern society, with many computer users having multiple computers dedicated for different purposes including work use, personal use, family or shared use, and the like. It is common for a user to use multiple computers on a regular basis, and even simultaneously. Many of these computers each include a number of peripheral devices for controlling certain aspects including data input (e.g., keyboards, computer mice, game controllers, "input devices," etc.), data output (e.g., speakers, "output devices," etc.), and other applications (e.g., data storage). In many conventional systems, users that regularly access multiple computing devices have to carry and manage multiple sets of peripheral devices, which can be cumbersome as each set may be exclusively paired to a specific computing device.

There has been some progress in alleviating this problem. For example, some systems allow reusing a single input device for data entry to multiple computing devices. However, these solutions are not without their drawbacks. One significant drawback with prior solutions is how the process of switching multiple data input devices from a first host computing device to a second host computing device is done. In some prior solutions, in order to switch both the keyboard device and the mouse device to a second host computing device, the user would have to perform two separate actions, which can be detrimental to the user experience. For example, in prior solutions, both the keyboard device and the mouse device are independently paired with each of the two or more host computing devices. When the user wants to switch from using a first host computing device to a second host computing device, the user has to individually change the pairing for each of the keyboard device and the mouse device.

Based on the foregoing, there is a need in the art for improved methods and systems to more efficiently switch input devices between multiple computing devices.

BRIEF SUMMARY

In further embodiments, a computer-implemented method includes sending, by a first host computer communicatively paired with an input device, a broadcast over a network requesting a response from other host computers on the network that are also communicatively paired with the input device; receiving, by the first host computer, a broadcasted response from a second host computer of the other host computers on the network indicating that the second host computer is communicatively paired with the input device; establishing, by the first host computer, a communicative connection with the second host computer via the network and automatically reestablishing the connection with the second host computer when the second host computer disconnects and reconnects to the network; and in response to detecting that a cursor controlled by the input device has moved to an edge of a display of the first host computer and that the input signal corresponds to a continued movement of the cursor beyond the edge of the display of the first host computer: sending, by the first host computer to the input device, a control signal to switch the communicative pairing of the input device from the first host computer to the second host computer.

The method can further include receiving, by the first host computer, a broadcasted response from a third host computer of the other host computers on the network indicating that the third host computer is communicatively paired with the input device, and establishing, by the first host computer, a communicative connection with the third host computer via the network and automatically reestablishing the connection with the third host computer when the third host computer disconnects and reconnects to the network. In some cases, the control signal can be a first control signal, and in response to determining that the second host computer has disconnected from the network and that the cursor on the first host computer has moved to the edge of the display of the first host computer, the method can further include sending, by the first host computer to the input device, a second control signal to switch the communicative pairing of the input device from the first host computer to the third host computer. The control signal can be a first control signal, and further in response to detecting that the cursor has moved to the edge of the display of the first host computer and that the input signal corresponds to continued movement of the cursor beyond the edge of the display of the first host computer, the method can further include sending, by the first host computer to the second host computer, a second control signal causing a processor in the second host computer to move a second cursor on a display of the second host computer. In some cases, the network can be a LAN, WAN, cloud-based network, or the like. The input device can be communicatively paired to the first host computer or the second host computer via a wireless communications protocol including one of Bluetooth, Bluetooth LE, Infra-red (IR), ZigBee, Ultra Wideband, or RF.

In some embodiments, a system can include one or more processors, and one or more non-transitory computer-readable storage mediums containing instructions configured to cause the one or more processors to perform operations including: sending, by a first host computer communicatively paired with an input device, a broadcast over a network requesting a response from other host computers on the network that are also communicatively paired with the input device; receiving, by the first host computer, a broadcasted response from a second host computer of the other host computers on the network indicating that the second host computer is communicatively paired with the input device; establishing, by the first host computer, a communicative connection with the second host computer via the network and automatically reestablishing the connection with the second host computer when the second host computer disconnects and reconnects to the network; and in response to detecting that a cursor controlled by the input device has moved to an edge of a display of the first host computer and that the input signal corresponds to a continued movement of the cursor beyond the edge of the display of the first host computer: sending, by the first host computer to the input device, a control signal to switch the communicative pairing of the input device from the first host computer to the second host computer. In some implementations, the one or more non-transitory computer-readable storage mediums further contain instructions to cause the one or more processors to perform operations including receiving, by the first host computer, a broadcasted response from a third host computer of the other host computers on the network indicating that the third host computer is communicatively paired with the input device, and establishing, by the first host computer, a communicative connection with the third host computer via the network and automatically reestablishing the connection with the third host computer when the third host computer disconnects and reconnects to the network.

In further embodiments, the control signal can be a first control signal, and the one or more non-transitory computer readable storage mediums can further contain instructions to cause the one or more processors to perform operations including, in response to determining that the second host computer has disconnected from the network and that the cursor on the first host computer has moved to the edge of the display of the first host computer: sending, by the first host computer to the input device, a second control signal to switch the communicative pairing of the input device from the first host computer to the third host computer. In some cases, the control signal can be a first control signal, and the one or more non-transitory computer-readable storage mediums can further contain instructions to cause the one or more processors to perform operations including, further in response to detecting that the cursor has moved to the edge of the display of the first host computer and that the input signal corresponds to continued movement of the cursor beyond the edge of the display of the first host computer: sending, by the first host computer to the second host computer, a second control signal causing a processor in the second host computer to move a second cursor on a display of the second host computer. In some cases, the network can be a LAN, WAN, cloud-based network, or the like. The input device can be communicatively paired to the first host computer or the second host computer via a wireless communications protocol including one of Bluetooth, Bluetooth LE, Infra-red (IR), ZigBee, Ultra Wideband, or RF.

In certain embodiments, a non-transitory computer-program product tangibly embodied in a machine-readable non-transitory storage medium includes instructions to cause a processor to: send, by a first host computer communicatively paired with an input device, a broadcast over a network requesting a response from other host computers on the network that are also communicatively paired with the input device; receive, by the first host computer, a broadcasted response from a second host computer of the other host computers on the network indicating that the second host computer is communicatively paired with the input device; establish, by the first host computer, a communicative connection with the second host computer via the network and automatically reestablish the connection with the second host computer when the second host computer disconnects and reconnects to the network; and in response to detecting that a cursor controlled by the input device has moved to an edge of a display of the first host computer and that the input signal corresponds to a continued movement of the cursor beyond the edge of the display of the first host computer: send, by the first host computer to the input device, a control signal to switch the communicative pairing of the input device from the first host computer to the second host computer.

In some embodiments, the computer-program product further includes instructions to cause a processor to receive, by the first host computer, a broadcasted response from a third host computer of the other host computers on the network indicating that the third host computer is communicatively paired with the input device, and establish, by the first host computer, a communicative connection with the third host computer via the network and automatically reestablishing the connection with the third host computer when the third host computer disconnects and reconnects to the network. In some cases, the control signal can be a first control signal, and the computer-program product can further including instructions to cause a processor to: in response to determining that the second host computer has disconnected from the network and that the cursor on the first host computer has moved to the edge of the display of the first host computer: send, by the first host computer to the input device, a second control signal to switch the communicative pairing of the input device from the first host computer to the third host computer.

In further embodiments, the control signal can be a first control signal, and in response to determining that the second host computer disconnected from the network, and detecting that the cursor on the first host computer has moved to the edge of the display, the instructions further cause a processor to send, by the first host computer to the input device, a second control signal to switch the communicative pairing of the input device from the first host computer to the third host computer. In some cases, the network can be a LAN, WAN, cloud-based network, etc.

BRIEF DESCRIPTION OF THE DRAWINGS

The detailed description is set forth with reference to the accompanying figures.

FIG. 21A shows a simplified block diagram showing synchronized applications operating on separate host computers, according to certain embodiments.

FIG. 21B shows a simplified block diagram showing synchronized applications operating on separate host computers, according to certain embodiments.

DETAILED DESCRIPTION

Figure 1:
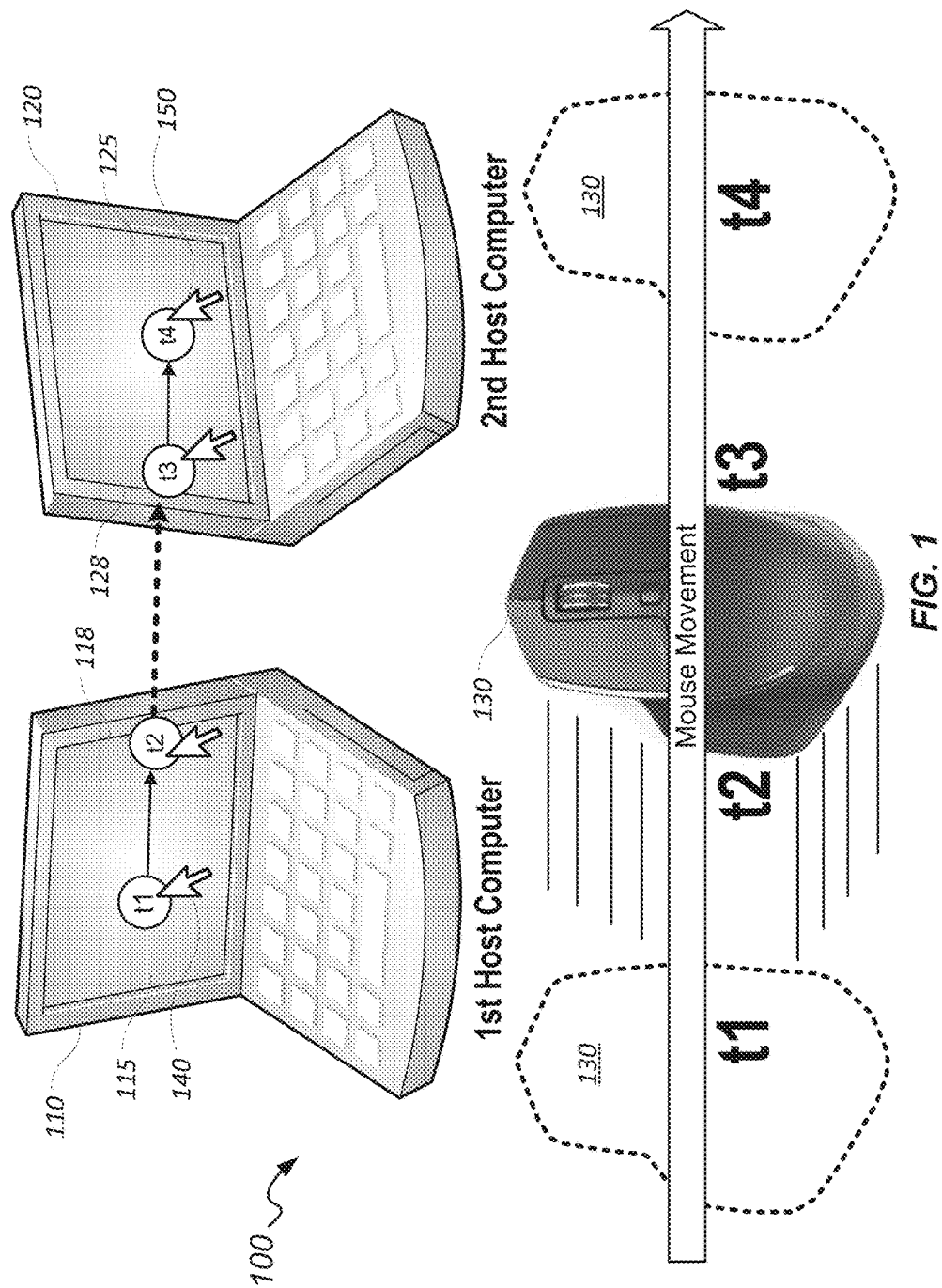
FIG. 1 shows aspects of a system for enabling automatic switching of an input device between host computers, according to certain embodiments.

The present disclosure relates in general to computing devices, and in particular to systems and methods for automatically switching a multi-host switching device between host computing devices.

In the following description, various embodiments of automatic switching between computing devices will be described, among other inventive concepts. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiments being described.

In certain embodiments, a user can cause an input device to automatically switch pairing from a first host computer to a second host computer by moving a cursor on a display of the first host computer to and/or beyond an edge of the display. This "edge trigger" event can cause the first host computer to send a first control signal to the input device to switch its pairing from the first host computer to the second host computer, and a second control signal to the second host computer indicating where the cursor should be located on its display to simulate what appears to a user to be a continuous and seamless movement of the cursor from the display of the first host computer to the display of the second host computer. In some embodiments, contents from a virtual clipboard (e.g., on the first host computer) can be transferred to a virtual clipboard of the second host computer in response to the edge trigger event, which may include text, media, executable files, and the like. In some cases, three or more host computers may share an input device and include edge trigger capabilities for continuous and seamless cursor movements between each of their corresponding displays. Devices or entities that are "communicatively coupled" can have bidirectional electronic communication with one another. Devices that are "paired" to a device typically send control signals (e.g., movement detection, button presses, scroll wheel movement, etc.) to a single host computer at a time, but may be simultaneously and communicatively coupled with multiple host computers.

A host computer can be any suitable computing device including a desktop computer, laptop computer, netbook, tablet computer, smart phone, personal digital assistant, and the like. An input device can include a computer mouse, a keyboard, a gaming controller, a track ball, a touch pad, a remote control device, wearable technologies (e.g., smart watches, headsets), speakers, microphones, and the like. Although the embodiments that follow include specific types of computing devices, input devices, operating systems, etc., it should be understood that those specific types are shown for the purpose of illustrating the novel systems, methods, and concepts that follow and should not be interpreted as restrictive with respect to the types of computing devices, input devices, and operating systems (e.g., MS Windows, Apple operating systems, iOS, Android OS, etc.) that may be used. That is, any type of computing device, input device, operating system, etc., can be used in any of the embodiments expressly described herein as well any embodiments not expressly described, but within the broad purview of this disclosure.

Overview of Certain Embodiments

FIG. 1 shows aspects of a system 100 for enabling automatic switching of an input device 130 between host computers, according to certain embodiments. System 100 includes first host computer 110, second host computer 120, and input device 130. First host computer 110 includes display 115. Second host computer 120 includes display 125. Input device 130 controls cursor 140 and is shown as a computer mouse having multi-host switching capabilities.

Input device 130 is shown moving from left-to-right over a time period defined by $t_1$-$t_4$. At time $t_1$, input device 130 is stationary and cursor 140 is shown on display 115 of first host computer 110. At time $t_2$, input device 130 is moving left-to-right causing cursor 140 to reach edge 118 of display 115, which initiates an edge trigger event. In response, first host computer 110 sends a control signal to input device 130 to switch communicative pairing from first host computer 110 to second host computer 120. First host computer 110 may further send a second control signal to second host computer 120 providing information that may include a location of cursor 140 on display 115, the trajectory of cursor 140 (e.g., speed and direction of cursor 140 prior to reaching edge 118), virtual clipboard data (e.g., alphanumeric data, media data, etc.) for first host computer 110, and/or other corresponding data, such that cursor 150 may be positioned on display 125 by second host computer 120 at corresponding edge 128 to simulate a split-screen movement of a cursor between displays 115, 125. In some embodiments, an edge trigger event may be caused when the cursor reaches a "flow-enabled" edge and additional input signals are received corresponding to a continued motion beyond the flow-enabled edge.

By time $t_3$, input device 130 has switched pairing from first host computer 110 to second host computer 120 and cursor 150 is positioned on edge 128 of display 125 on second host computer 120. At time $t_4$, input device 130 comes to a stop along with corresponding cursor 150 on display 125. Thus, the user experiences what appears to be a seamless and continuous movement of cursor 140 at time $t_1$ to the location of cursor 150 by time $t_4$ when, in fact, the movement of cursors 140 and 150 and their corresponding displays 115, 125 may be independently controlled by the different operating systems of first and second host computers 110, 120.

In some cases, there may be a small but perceptible delay between switching from a first host computer to a second host computer. Some embodiments may utilize trajectory data from cursor 140, including the cursor speed and direction, to calculate where cursor 140 would have ended up in a split-screen scenario, and subsequently move cursor 150 toward a corresponding location on host computer 120 during the delay period to give the illusion of a continuous movement and "flow" between the first and second host computers. This is further discussed below with respect to FIGS. 9-10. It should be noted that any number of host computing devices may be used and any suitable communication protocol between the host computing devices or between the input device and the host computing devices can be used, as further discussed below.

An Embodiment of a Typical System Architecture

Figure 2:
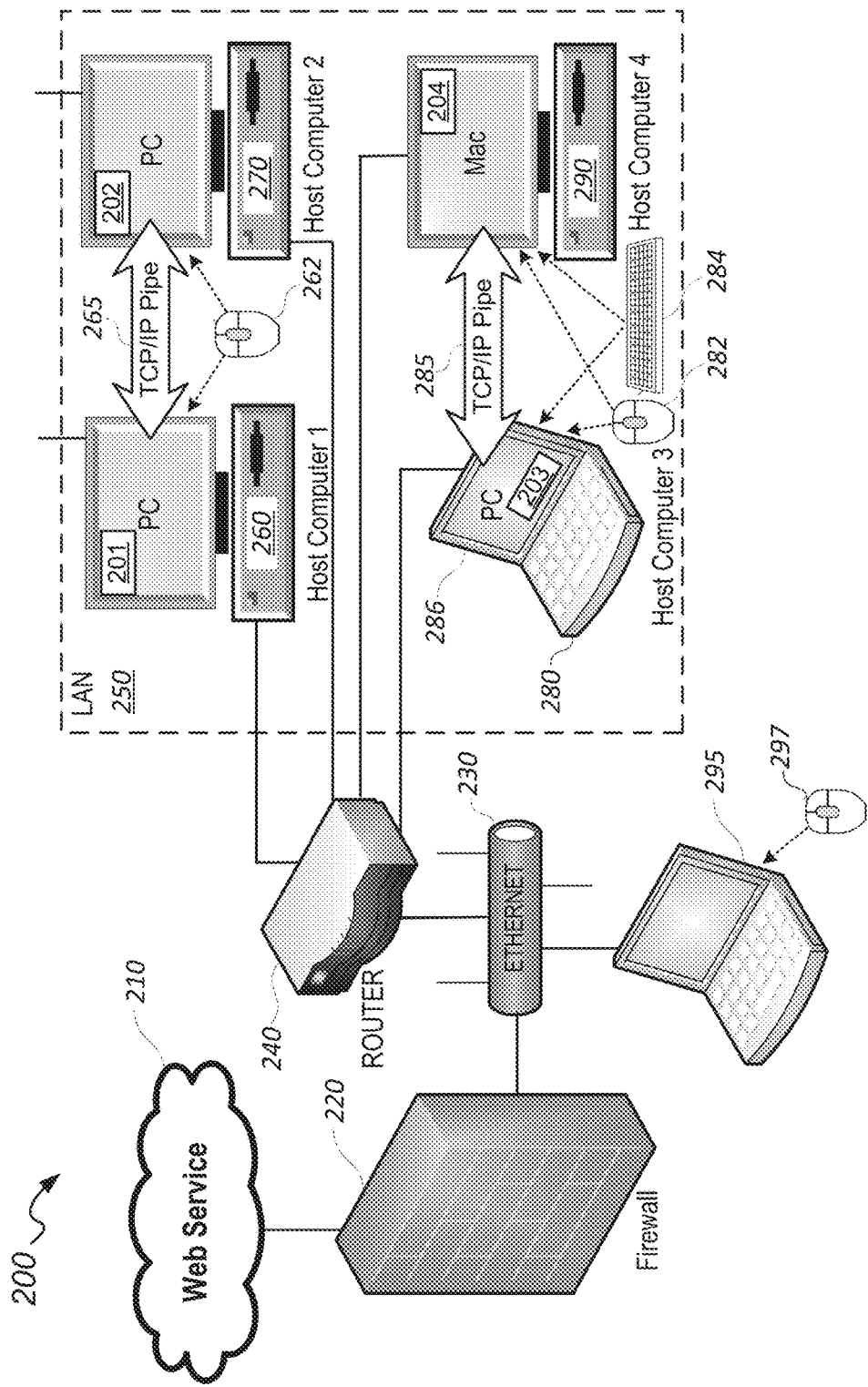
FIG. 2 shows a system for enabling automatic multi-host switching for an input device, according to certain embodiments.

FIG. 2 shows a system 200 for enabling automatic multi-host switching for an input device, according to certain embodiments. System 200 includes web service provider 210, firewall 220, Ethernet connection 230, router 240, and local-area network (LAN) 250. LAN 250 includes first host computer (host) 260, second host computer (host) 270, third host computer (Host) 280, and fourth host computer (host) 290. Ethernet connection 230 is coupled to web service provider 210 through firewall 220. Router 240 is communicatively coupled to Ethernet hub 230. A fifth host computer (host) 295 is coupled to Ethernet connection 230. Each host 260-290 can be communicatively coupled to router 240 to form LAN 250. Input device 262 (e.g., a computer mouse) can be multi-host switching enabled (i.e., can be paired to multiple computing devices) and may be communicatively coupled to host 260 and host 270. Input devices 282 (e.g., computer mouse) and 284 (e.g., keyboard) can be multi-host switching enabled and may be communicatively coupled to hosts 280 and 290. Input device 297 can be communicatively coupled to host 295. The input devices can be communicatively coupled to their respective host computers via any suitable wireless communication protocol including, but not limited to, Bluetooth, Bluetooth Low-Energy (BTLE), infra-red (IR), RF, ZigBee, Logitech Unifying, or other suitable communication standard. Each host computer can include "flow" software (201-204) to enable and support automatic switching between host computing devices as further discussed below. System 200 and any other embodiments discussed or contemplated in this document (e.g., FIGS. 1-19) that utilize display-based (e.g., pixel-based) triggers to automatically switch an input device for a first host computer to a second host computer can be generically referred to as a "flow-enabled system."

Any suitable web service provider, firewall (if applicable), Ethernet connection, and router may be used, in any suitable configuration. Other methods of providing internet service capabilities for system 200 are applicable. The operational details and communicative interaction between web service provider 210, firewall 220, Ethernet connection 230, and router 240 are not discussed in detail as they are commonly understood by those of ordinary skill in the art. In some embodiments, a LAN may be a closed network and, e.g., may not be connected to a web service provider. In such instances, the novel concepts described herein including the automatic switching of an input device between multiple host computers and transferring contents stored in memory (e.g., virtual clipboard) still applies in a standalone LAN, as would be appreciated by one of ordinary skill in the art.

In some embodiments, host computers 260, 270, 280, 290 may include corresponding flow software (201-204) that supports automatic multi-host switching for input devices and cursor/data "flow" between host computers. System 200 can provide a user experience of a seamless and continuous "flow" of a cursor from a first host computer to a second host computer because the host computers, via the flow software, may be in continuous and/or periodic communication with each other and may share data including an identification of a shared input device (i.e., unique identification code), operational settings (i.e., in flow software), a location of the cursor, textual data or media on a virtual clip board, etc. Thus, when a user moves a cursor and initiates an edge trigger event on a first host computer, a second host computer can determine where its cursor should be located, based on the shared data, to simulate a seamless and continuous movement of a cursor from the first host computer to the second host computer.

In some implementations, one or more host computers may initiate an auto discovery process to determine what other devices on the LAN share one or more input devices. Referring to FIG. 2, host 260 is communicatively coupled with input device 262 (i.e., a computer mouse with multi-host switching capabilities). Host 260 can send (e.g., via local software 201) a broadcast message over the LAN to request a response from one or more other host computers (i.e., host computers 270-290) that are also communicatively coupled to input device 262. The message may include data that uniquely identifies input device 262. The message may be sent via universal datagram protocol (UDP), a publish/subscribe system, or other suitable communications protocol. In system 200, host 270 may send a response message providing its network name and confirming that it is coupled to input device 262. Any host computer on the LAN may initiate the discovery process.

Once host 260 receives confirmation (e.g., via UDP broadcast) that host 270 is communicatively coupled to input device 262, hosts 260, 270 may establish a direct communicative link 265 to support continuous and/or periodic communication between the two computers. In FIG. 2, the direction communicative link uses Transmission Control Protocol/Internet Protocol (TCP/IP), although other secure communication protocols are contemplated (e.g., RINA). Once direct communication is established (and maintained) between host computers, edge-triggered multi-host switching on an input device can be supported. In some embodiments, system 200 may enable multiple input devices (e.g., input devices 282, 284) to be shared and auto-switched between host computers (e.g., hosts 280, 290), for example, by edge triggering, as further discussed below.

Figure 3:
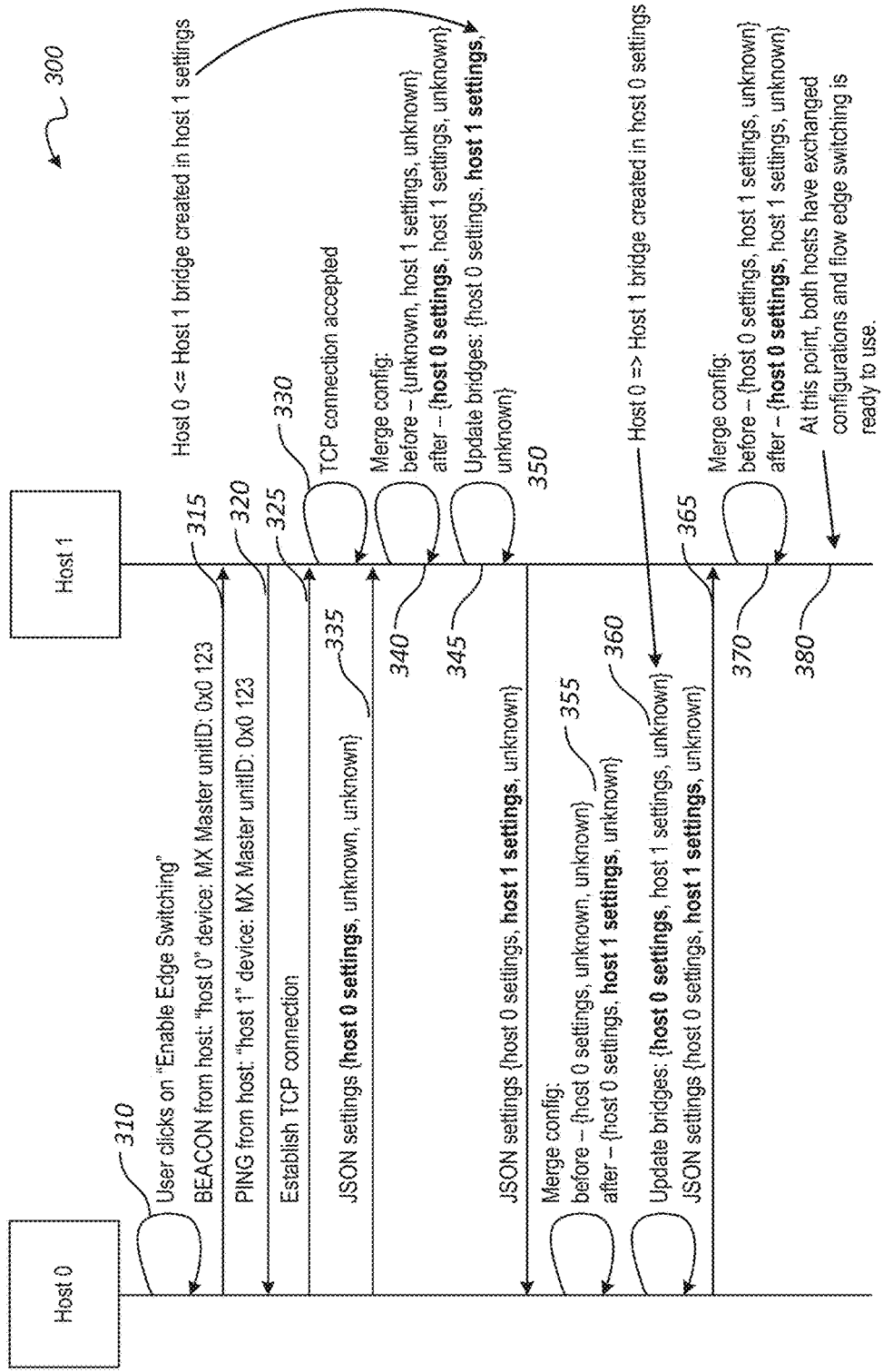
FIG. 3 is a flow diagram showing an auto-discovery process of hosts on a subnet, according to certain embodiments.

FIG. 3 is a flow diagram 300 showing an auto-discovery process of hosts on a subnet, according to certain embodiments. Specifically, the auto-discovery process includes determining, by a first host 310 coupled to an input device, if other hosts on a subnet (e.g., LAN or network, in general) are also coupled to the input device. Once the other hosts are discovered, a direct communications link (e.g., TCP) can be established between the hosts and automatic multi-host switching can begin. In some embodiments, flow diagram 300 may illustrate the auto-discovery process described above with respect to FIG. 2 regarding hosts 260, 270 and input device 262. Flow diagram 300 can be performed by corresponding software 220 for each host 260, 270.

At step 310, a user may make a selection using software 201 to enable automatic switching on a user interface operated on host 260 (i.e., "host 0"). In some embodiments, automatic switching may be triggered by "edge triggering" or "edge switching," as further discussed below at least with respect to FIGS. 5-8.

At step 315, software 201 can cause host computer 260 to broadcast a message to other host computers on LAN 250 (e.g., via UDP) to determine if other host computers (e.g., host 270-290) share the same input device 262. The broadcasted message can include the broadcasting host's name (e.g., "host 0") and a unique identifier for input device 262. At step 320, host 270 ("host 1") broadcasts a response message (e.g., via UDP) including its host name ("host 1") and the unique identifier for input device 262, confirming that host 260 is also communicatively coupled to input device 262.

At step 325, host 260 (host 0) can send a request to host 270 (host 1) to establish a secure direct communications link (e.g., TCP). At step 330, host 270 can accept the TCP connection with host 260. At step 335, host 360 can send a secure message to host 270. Secure messaging between host computers can be in any suitable format such as JSON, XML, CSV, EDN, etc., as would be understood by one of ordinary skill in the art. The secure message can include host 260 software 201 settings associated with input device 262. This may include button/feature configurations, dots-per-inch (dpi) settings, edge or location detection settings, display settings (e.g., which edges, regions, or locations cause input device 262 to switch between connected hosts 260, 270), and the like.

At step 340, host 270 can receive software settings for software 201 and updates an internal database in software 202 that dynamically keeps track of software settings for each connected host. Thus, at step 340, host 270 may have settings for both host 260 and host 270 and host 270 updates the bridge (connection) between them (step 345). At step 350, host 270 can send a secure message to host 370. The secure message can include host 370 software 202 settings and other data associated with input device 262, as discussed above with respect to host 260 in step 335.

At step 350, host 260 can receive software settings for software 202 and update an internal database in software 201 that dynamically keeps track of software settings for each connected host. Thus, at step 355, host 270 may update settings for both host 260 and host 270 and update the bridge (connection) between them (step 360).

At step 365, host 260 can send updated settings for itself (e.g., input device settings, cursor location/trajectory, etc.) to host 270. At step 370, host 270 may receive software settings for software 201 and update an internal database associated with software 201 that dynamically keeps track of software settings, cursor location, etc., for each connected host. At step 380, both hosts 260, 270 have exchanged software configurations and automatic switching for input device 161 is ready for use.

Figure 4:
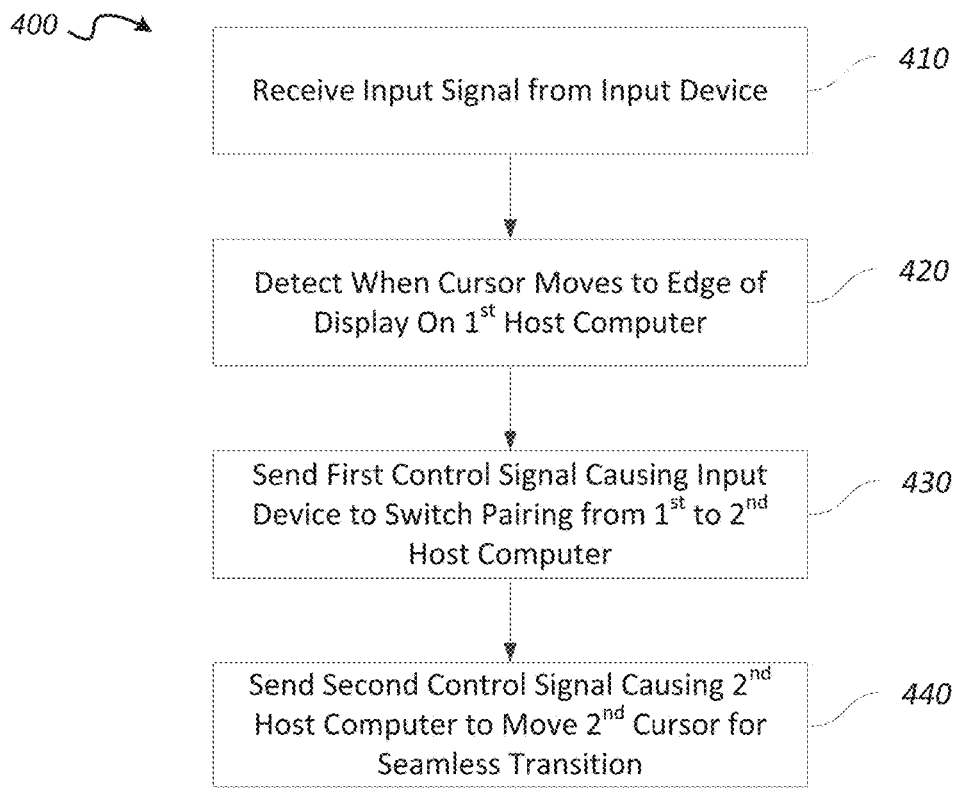
FIG. 4 shows a simplified method for automatically causing an input device to switch between host computers in response to detecting an edge trigger event, according to certain embodiments.

FIG. 4 shows a simplified method 400 for automatically causing an input device to switch between host computers in response to detecting an edge trigger event in a flow enabled system, according to certain embodiments. Method 400 (as well as any of the other methods discussed below including methods 1000, 1200, 1400, 1500, and 1800) can be performed by processing logic that may comprise hardware (circuitry, dedicated logic, etc.), software operating on appropriate hardware (such as a general purpose computing system or a dedicated machine), firmware (embedded software), or any combination thereof. To provide a non-limiting point of reference for the reader, the steps of method 400 are described with respect to system 100 of FIG. 1. In certain embodiments, method 400 can be performed at least by the systems shown and described in FIGS. 1-3 (e.g., host 110, host 260) and system 2000 of FIG. 20. Specifically, method 400 (and methods 1000, 1200, 1400, 1500, and 1800) may be performed by flow software, as shown and described above with respect to FIG. 2.

At step 410, method 400 can include receiving, by first host computer 110, an input signal from input device 130 corresponding to a movement of cursor 140 on display 115 of host computer 110. Input device 130 can be communicatively paired with first host computer 110. In some embodiments, first host computer 110 can be communicatively coupled with second host computer 120 (e.g., after the discovery steps described above with respect to FIG. 3).

At step 420, method 400 may include detecting, by first host computer 110, when cursor 140 moves to edge 118 on display 115 of first host computer 110. At step 430, in response to first host computer 110 detecting that cursor 140 has moved to edge 118 of display 115 of first host computer 110, method 400 can include sending, by first host computer 110 to input device 130, a first control signal to switch the communicative pairing of input device 130 from first host computer 110 to second host computer 120.

At step 440, method 400 can further include sending, by first host computer 110 to second host computer 120, a second control signal causing second host computer 120 to move second cursor 150 on display 125 of second host computer 120 to a location to simulate a continuous movement or "flow" of cursor 140 from edge 118 of display 115 on first host computer 110 to a corresponding edge 128 of display 125 on second host computer 120, as shown, e.g., at times $t_2$-$t_3$ in FIG. 1.

Edge detection can include detecting cursor 140 on a single edge or on one of several flow-enabled edges that can trigger edge detection. For instance, edge detection on a first edge 118 may cause input device 130 to switch from host 110 to host 120. However, edge detection on a different edge of display 115 may cause input device 130 to switch from host 110 to a third host device (not shown). Any number of edges or portions thereof can trigger edge detection. In some embodiments, detecting cursor 140 in certain defined regions or areas of display 115 may cause input device 130 to switch between host computers. An edge may defined by a single row or column of pixels. In some cases, an edge may be defined by a number of rows or columns of pixels (e.g., right edge of display 115 at 5 pixel columns wide). Some embodiments may further include detecting a speed or trajectory (i.e., vector—speed and direction) of cursor 140 prior to and/or at the time of contacting an edge and may trigger edge detection based on both cursor location and speed (e.g., movement greater than 100 pixels/second).

It should be appreciated that the specific steps illustrated in FIG. 4 provide a particular method 400 for automatically causing an input device to switch between host computers in response to detecting an edge trigger event, according to certain embodiments. Other sequences of steps may also be performed according to alternative embodiments. For example, alternative embodiments may perform the steps outlined above in a different order. Moreover, the individual steps illustrated in FIG. 4 may include multiple sub-steps that may be performed in various sequences as appropriate to the individual step. Furthermore, additional steps may be added or removed depending on the particular applications. For example, in some embodiments, first host computer 110 may send a first control signal to the input device to initiate a switch between host computers, but may not be in communication with second host computer 120, thus eliminating the "flow" portion described in step 440. Alternatively or additionally, some embodiments of method 400 can further include (e.g., at step 420) detecting when the input signal corresponds to a continued movement of the cursor beyond the edge of the display of the first host computer. In such cases, triggering a flow event and sending the first and second control signals would require that the cursor not only move to an edge of the display, but continue to receive input device signals indicating continued movement in that particular direction (e.g., a user moves the cursor to the edge, which stops the cursor, but the user continues to the move the input device in the same direction, which may show that the user wants to "flow" from one host computer to the next, rather than intentionally hovering the cursor at or near the display edge.). One of ordinary skill in the art would recognize and appreciate many variations, modifications, and alternatives of method 400.

Edge Detection: Location

Figure 5:
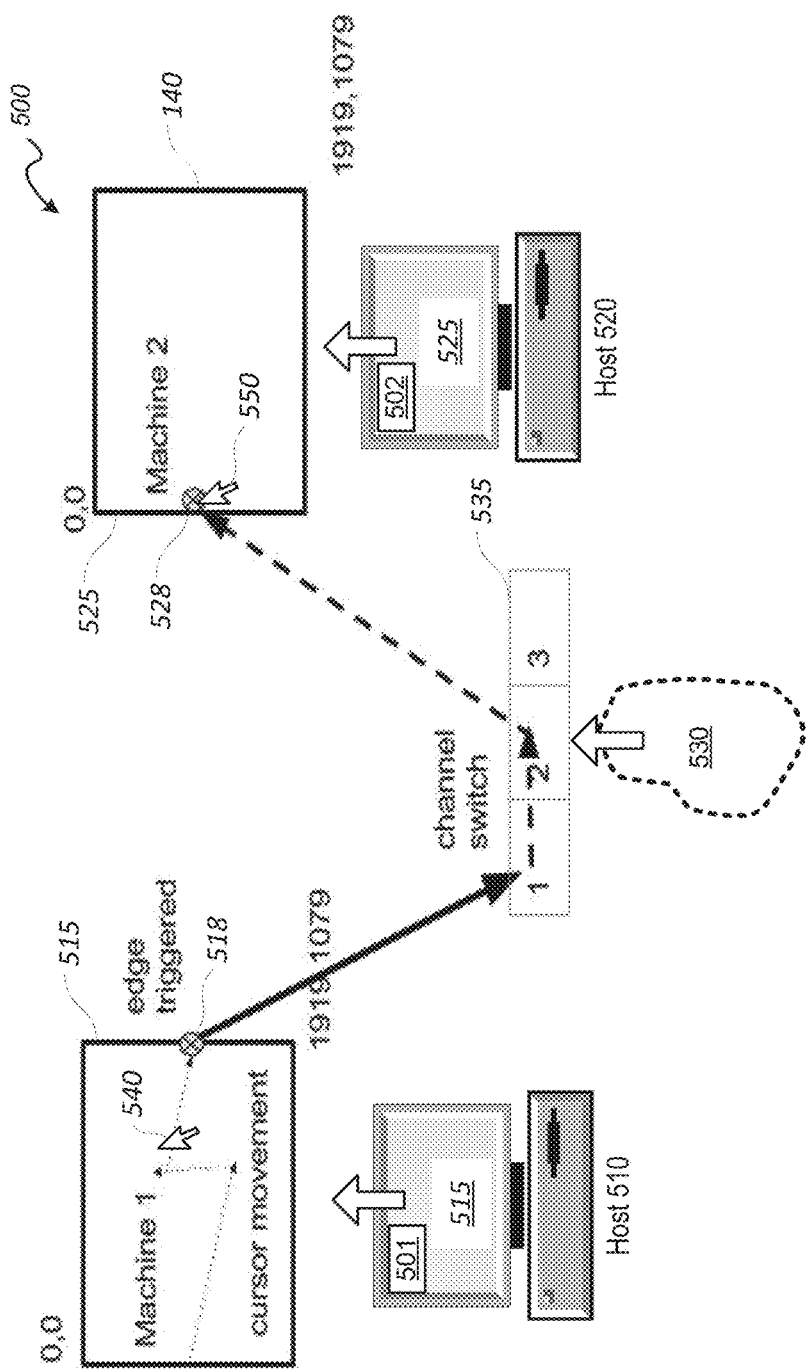
FIG. 5 is a simplified block diagram showing an edge-triggered switch of an input device between a first host computer and a second host computer, according to certain embodiments.

FIG. 5 is a simplified block diagram 500 showing an edge-triggered switch of an input device switch between a first host computer and a second host computer, according to certain embodiments. Block diagram 500 includes a display 515 from a first host computer ("host 510"), a display 525 on a second host computer ("host 520"), and a multi-channel switch 535 on an input device 530. Multi-channel switch 535 can be switched between three user programmable channels. Some input devices 530 may have more or fewer channels. In some embodiments, channel 1 may cause input device 530 to be paired with host 510, channel 2 may cause input device 530 to be paired with host 520, and channel 3 may cause input device 530 to be paired with a third host computer (not shown) or may not be associated with any host computer (as shown). Any programmed configuration of the channels is possible, as would be understood by one of ordinary skill in the art. Host 510 may include flow software 501. Host 520 may include flow software 502. Software 501, 502 may operate similarly to flow software 201 as described above with respect to FIG. 2.

Displays 515 and 525 each include a 2-dimensional (2D) array of 1919×1079 pixels defining a viewing area. Any pixel resolution can be used and different host computers may include displays having different pixel resolutions. Display 515 shows a cursor 540 come into contact with edge 518, causing software 501 to initiate an edge trigger event and causing multi-channel switch 535 of input device 530 to switch communicative pairing from host 110 to host 120. The edge trigger event may also cause host 120 to place 550 at edge 528 to simulate what appears to be a smooth transition of a cursor from display 515 to display 525, as further discussed above. Referring to FIG. 5, an edge trigger may occur on the single pixel column defined by 0,1079 to 1919,1079. An edge can be multiple pixels wide and may cover a full edge or a portion thereof. In some implementations, a trigger may be associated with a row, column, or area of pixels not necessarily on an edge of a display. For example, a number of graphical icons representing several different host computers on a LAN may be configured on a display to be "flow" triggers that cause an input device to switch to a corresponding host when a cursor contacts (or overlaps) the icon.

Edge Detection: Speed

In some embodiments, "flow" software (e.g., software 201 on host 260) can monitor cursor movement, position, and speed. When a cursor reaches a user configured edge trigger on a display and the speed of the input device meets or exceeds a user defined speed threshold (e.g., 100 pixels per second), then the input device can switch to a different channel (i.e., switch between host computers). Any suitable speed threshold may be used, which may be greater or less than 100 pixels per second.

Edge Detection: Safe Zones

In certain embodiments, "flow" software (e.g., software 201 on host 260) can include "safe zones" that prevent a user from inadvertent rapid switching between host computers. This may occur, for example, when a user moves a cursor very close to an edge of a display and, due to small input device sensor jitters, the cursor repeatedly performs edge triggers between two host computers. Thus, by establishing a "safe zone" on the receiving end of a flow (i.e., a second host computer in a flow from a first host computer to the second host computer) a user has to move the cursor outside of an area typically located around the point of entry of the flow such that a flow back to the first host computer is more likely to be intentional. That is, a safe zone can be a region defined by an area (e.g., 50×50 square pixel area) that turns off edge detection in that particular region of the edge trigger.

Figure 6:
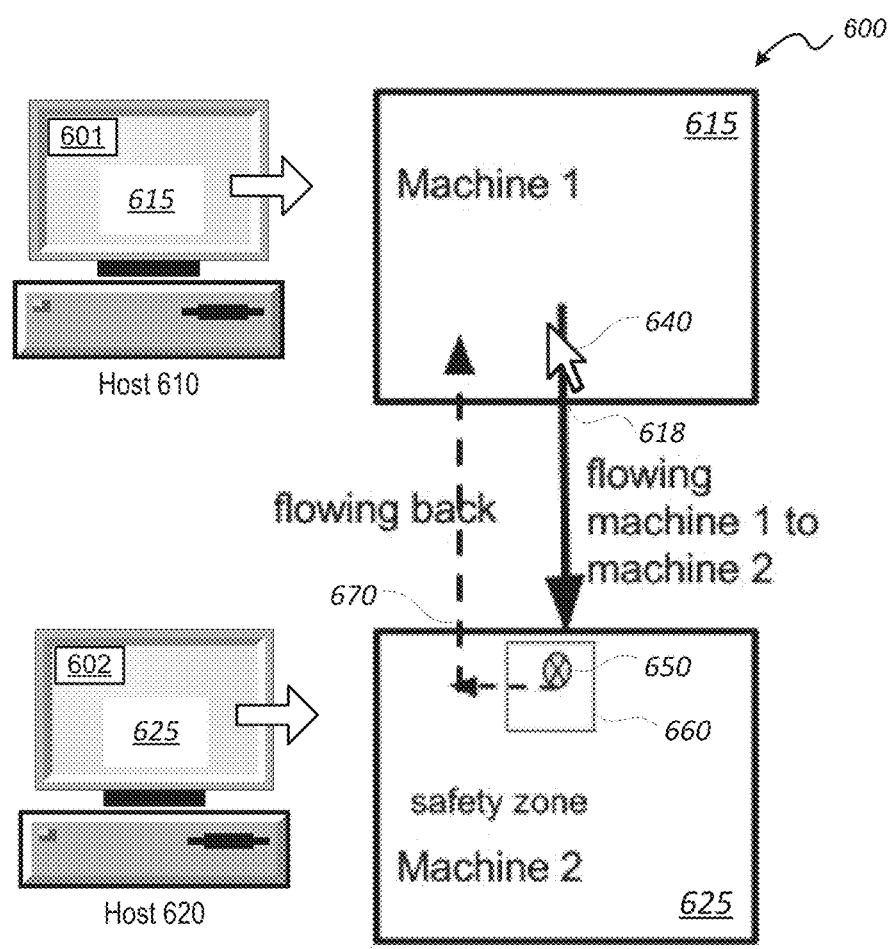
FIG. 6 shows the use of a safe zone in a flow-enabled system, according to certain embodiments.

FIG. 6 shows the use of a safe zone 660 in a flow-enabled system 600, according to certain embodiments. System 600 includes a display 615 from a first host computer ("host 610"), and a display 625 on a second host computer ("host 620"). Host 610 may include flow software 601, and host 620 may include software 602. Software 601, 602 may operate similarly to flow software 201 as described above with respect to FIG. 2. Displays 615 and 625 each include a 2-D array of pixels defining a viewing area, as further discussed above with respect to FIG. 5. Display 615 shows a cursor 640 come into contact with edge 618, causing flow software 601 to initiate an edge trigger event causing a corresponding input device (not shown) to switch communicative pairing from host 610 to host 620. When switched, cursor 640 on display 615 appears to "flow" to position 650 on display 625. Position 650 is located within a "safe zone" 660 or a bounded region that prevents edge detection in that region to prevent an inadvertent edge trigger event causing input device to flow back to display 615. Safe zone 660 can be of any size or shape and may be continuous or discontinuous (i.e., multiple disjointed safe zones). As shown in FIG. 6, the user has to move the cursor out of safe zone 660 to path 670 (or any other edge trigger region outside of safe zone 660) to initiate a flow back to display 615.

Edge Detection—Minimum Threshold Time

In some embodiments, flow software can monitor time stamps corresponding to input device activation and deactivation. An input device may be activated when flow software on a first host computer detects that the input device "flowed" in (i.e., switched in) from a second host device. An input device may be deactivated when flow software on a first host computer detects that the input device "flowed" out (i.e., switched) to a second host computer. A minimum threshold time may be implemented between "flows" to avoid accidental jumping between host computers (e.g., due to input device sensor jitters). In some embodiments, the minimum threshold time can be user programmable and may be 100 ms. The minimum threshold time can be any suitable time that is shorter or longer than 100 ms. In some cases, the minimum threshold time may be application specific or may change dynamically based on input device movement over a period of time.

Figure 7:
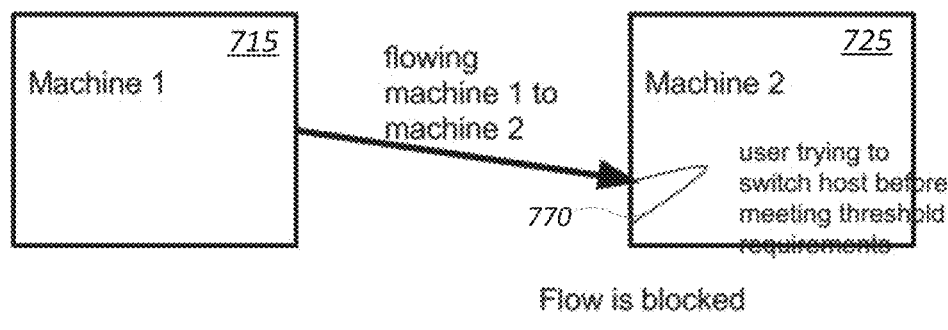
FIG. 7 shows the effect of a minimum threshold time applied to a flow-enabled system, according to certain embodiments.
Figure 8:
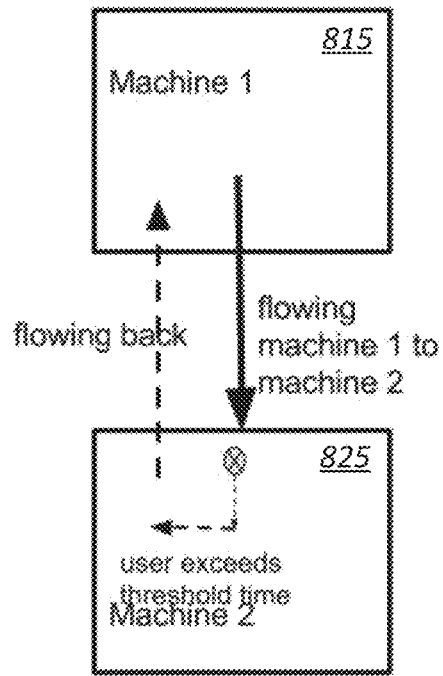
FIG. 8 shows the effect of a minimum threshold time applied to a flow-enabled system, according to certain embodiments.

FIGS. 7-8 depict flow scenarios between two host computers with similar system architectures as is described above with respect to FIGS. 1-6. It should be understood that the diagrams are simplified to emphasize aspects of implementing threshold times in flow-enabled systems and include associated host computers, corresponding flow software, one or more multi-host input devices, and the like.

FIGS. 7-8 further show the effect of a minimum threshold time applied to a flow-enabled system, according to certain embodiments. FIG. 7 includes display 715 of a first host computer, and display 725 of a second host computer. A minimum threshold time is set to be 100 ms, although other times may be used. In FIG. 7, a user "flows" from display 715 to display 725. Immediately afterwards, and before the minimum threshold time (i.e., less than 100 ms), the user moves a cursor on display 725 to an edge trigger 770, resulting in the flow process being rejected. That is, the input device remains paired with the second host computer (i.e., cursor control stays on the second host computer) rather than flowing back to the first host computer. In FIG. 8, the user exceeds the minimum threshold time (greater than 100 ms) after an initial flow from a first host computer to a second host computer, and the return flow process back to the first host computer is allowed to proceed.

Compensating for Network/Device Pairing Delays—Using Cursor Trajectory

In some embodiments, there may be some undesirable delay introduced in a flow-enabled system. Some sources of delay may stem from host (e.g., TCP network lag, cloud-based network lag), from the input device (e.g., channel switch lag, input device-to-host reconnection), or both. Such delays can, in some configurations, appreciably affect the performance of the flow process and could result in a user-perceptible pause between an edge trigger event on a first host computing device and subsequent control of a cursor on a second host computing device, which could negatively impact the user experience. Certain embodiments of the invention compensate for such delays by analyzing a trajectory of a cursor on the first computing device and applying it to the second computing device to simulate a continuous movement of the cursor during a period of time where control data from the input device is not actually available. This may help improve the user experience of getting immediate feedback on cursor movement while background connections are getting established.

Figure 9:
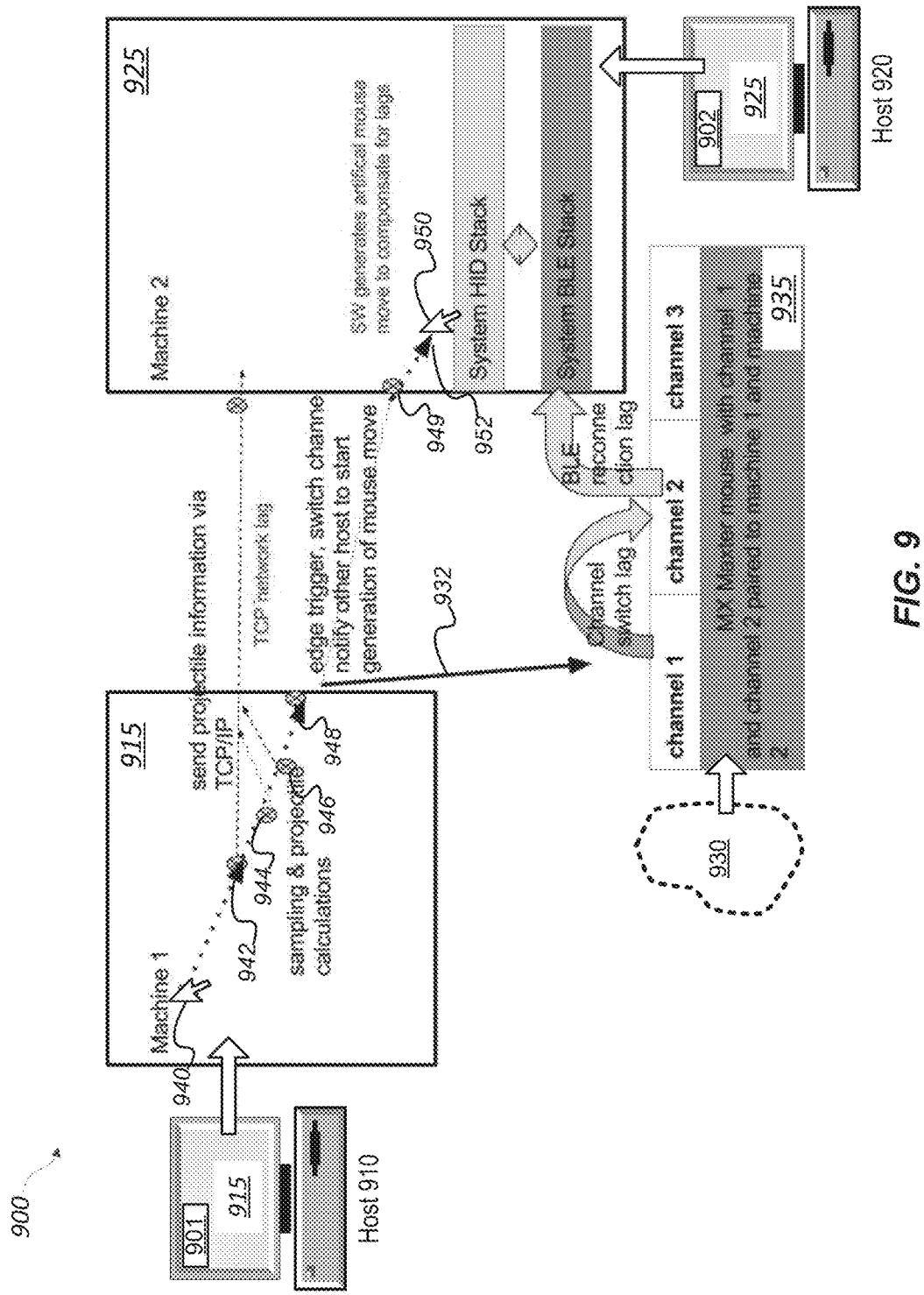
FIG. 9 shows a simplified block diagram showing a method for cursor trajectory-based delay compensation in a flow-enabled system, according to certain embodiments.

FIG. 9 shows a simplified block diagram 900 showing a method for cursor trajectory-based delay compensation in a flow-enabled system, according to certain embodiments. System 900 includes first display 915 on first host computer 910, and second display 625 on second host computer 920. Hosts 910, 920 may include flow software 901, 902, respectively. Software 901, 902 may operate similarly to flow software 201 as described above with respect to FIG. 2. In some embodiments, software 901, 902 may perform some or all of the "flow" related concepts discussed herein (e.g., edge detection, sending/receiving cursor location/projectile data, calculating trajectory, artificial cursor movement, etc.). Displays 915 and 925 can each include a 2-D array of pixels defining a viewing area, as further discussed above with respect to FIG. 5. However, the "flow" concepts described herein may apply to three-dimensional (3-D) displays, as would be understood by one of ordinary skill in the art.

Referring to FIG. 9, first display 915 includes cursor 940, which may be controlled by multi-host enabled input device 930 when input device 930 is switched to a first channel (channel 1). Second display 925 includes cursor 950, which may be controlled by multi-host enabled input device 930 when input device 930 is switched to a second channel (channel 2). Input device 930 can include more or fewer channels and each channel can be programmed to be associated with any host machine, as would be understood by one of ordinary skill in the art. Host 910 may have an established network connection (e.g., via TCP/IP, RINA, etc.) and bidirectional communication with host 920, as described above with respect to FIG. 2.

In some embodiments, as cursor 940 moves across display 915 to positions 942-946, the location of cursor 940 and its corresponding projectile data may be sent to other host computers (e.g., host 920) on the network. Cursor location data can be data that describes a cursor's present location on a display that a corresponding input device is currently paired to (e.g., currently sending cursor control data). In some embodiments, cursor location data (and projectile data) can be sampled and sent between each host in the network (or a subset thereof), regardless of whether the input device is currently paired to it. Cursor location data can be in any suitable format (e.g., monitor 2D pixel data), as would be appreciated by one of ordinary skill in the art.

Projectile data can include data the corresponds to cursor 940 speed, acceleration, vector (speed and direction), and the like, and may be generated and/or sent in any suitable format and at any frequency (e.g., periodic or continuously). In some embodiments, cursor location and projectile data may be sent via TCP/IP (or other communication protocol) at the time that the cursor is at a first/last pixel of a "flow-enabled" edge. In some cases, cursor location and projectile data can be sent before an "edge" detection event (e.g., every 100 ms, 1 s, or the like.). The cursor location and projectile data may be sampled and/or sent to other host computers at any suitable rate or frequency, as would be appreciated by one of ordinary skill in the art. Thus, as cursor 940 moves about display 915, other host computers on the network, despite any lag associated with the TCP/IP connection, can estimate cursor 940's present location and trajectory based on the periodically received cursor location and projectile data.

In some embodiments, the computation of a projectile (e.g., cursor movement) can happen on every mouse move report (or equivalent input device movement/action report). However, the actual sending of projectile information between host computers may or may not happen on each mouse move report (e.g., sending every 1, 10, or 50, etc., mouse move reports), which may be for the purposes of optimization and avoiding the resending of redundant information (e.g., if the mouse has not moved and no new data is generated).

In some embodiments, when cursor 940 reaches position 948, an edge trigger event is initiated. In response, host 910 may generate a control signal causing input device 930 to switch from channel 1 (host 910) to channel 2 (host 920), as described above with respect to FIG. 5, and further send a message (e.g., control signal) to host 920 indicating that an edge trigger event occurred. Host 920 can then start the artificial cursor movement for cursor 950 based on the received cursor location and projectile data of host 910 (i.e., how the cursor was previously moving) to simulate a continuous and uninterrupted cursor movement between host 910 to host 920, while host 920 waits for actual cursor control signals from input device 930 currently bogged down by system delay. As shown in FIG. 9, cursor 950 origination (location 949) and movement to location 952 on display 925 appears to be a continuous and uninterrupted flow with a trajectory similar to that of cursor 940 on display 915. By the time cursor 950 reaches location 952, host 920 may begin receiving cursor control signals from input device 930 to control cursor 950 (thereby ending artificial cursor movement) and a typical (input device controlled) cursor control may ensue on display 925. Thus, using artificial cursor movement during a "flow" process can help improve the overall user experience by providing what appears to be immediate feedback on cursor movement between host computers while the background connections get established.

Delay or lag can be introduced by a number of sources and may vary in duration from system to system. In some embodiments, the TCP/IP network between host 910 and 920 may introduce some lag (e.g., 10 ms-50 ms) and may vary depending on network traffic, density (number of computing devices on the network), and the like. Network lag may affect how long it takes host 920 to receive an indication that an edge trigger event occurred. Network lag may increase based on network traffic, network hardware specifications, or other hardware or software-based source of delay.

Channel switch lag, which is the time it takes to switch internally between channels on an input device (e.g., switching between channel 1 and 2), may vary depending on the type of input device 930 (e.g.,. typically less than 25 ms). Reconnection lag, which is the time it takes for the input device pair with the next host machine (e.g., channel 2 pairing with host 920), may vary depending on the type of communication protocol. Reconnection lag may be caused by negotiations and/or authentication between an input device and a host computer. Reconnection lag may vary depending on the communication protocol or bus type, as would be understood by one of ordinary skill in the art. For instance, Logitech Unifying protocol receiver lag may typically be between 100 ms-200 ms. Bluetooth lag is typically between 2-3 s. Bluetooth Low Energy (LE) network lag is typically 600 ms-2 s. The Bluetooth delays are typically longer than Logitech Unifying as Bluetooth protocols are more generic (e.g., Logitech Unifying protocol is optimized for Logitech products) and typically includes the host stack attempting to validate device information and pairing information.

Figure 10:
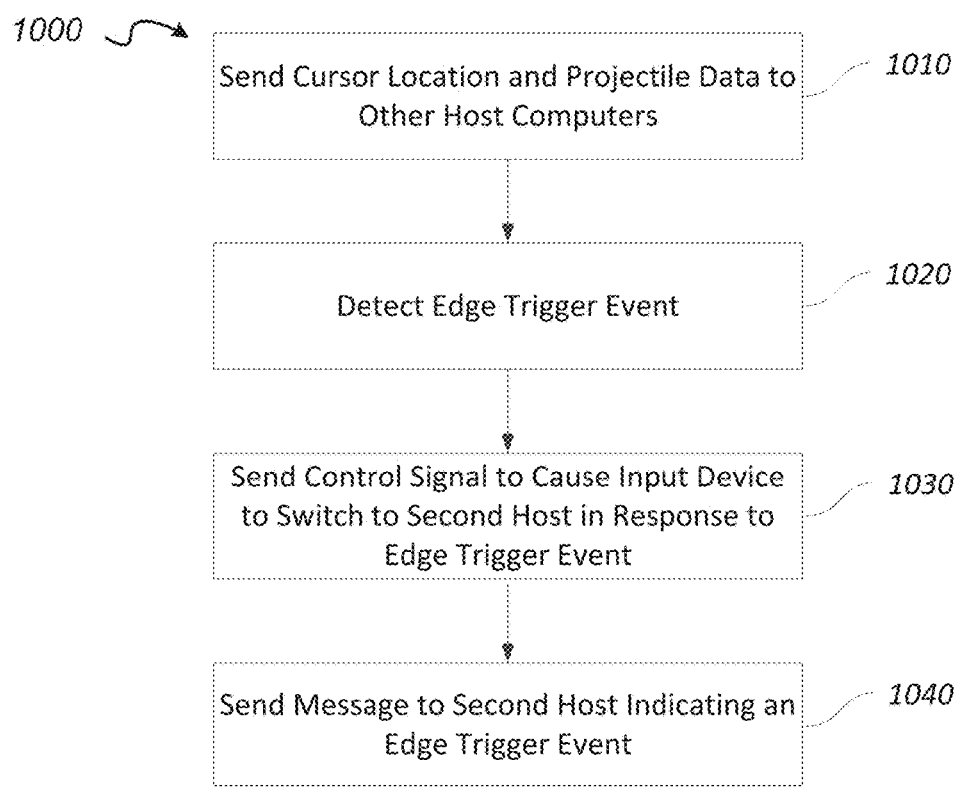
FIG. 10 shows a simplified method for cursor trajectory-based delay compensation in a flow-enabled system, according to certain embodiments.

FIG. 10 shows a simplified method 1000 for cursor trajectory-based delay compensation in a flow-enabled system, according to certain embodiments. At step 1010, method 1000 may include sending, by a first host computer (e.g., host 910) to a second host computer (e.g., host 920), cursor location and projectile data corresponding to a cursor (940) movement on the first host computer. The first and second host computers may communicate via a shared network connection (e.g., TCP/IP) at any suitable frequency (e.g., periodic or continuous cursor updates).

At step 1020, method 1000 may include the first host computer detecting an edge trigger event corresponding to the cursor on the first host computer reaching an edge (e.g., position 948 on display 915). Any suitable edge trigger requirements may be applied including cursor speed, safe zones, minimum threshold times, or the like.

At step 1030, in response to the edge detection, method 1000 may include the first host computer sending a control signal to an input device (930) to automatically cause the input device to switch wireless pairing from the first host computer (e.g., channel 1) to the second host computer (e.g., channel 2). At step 1040, also in response to the edge detection, method 1000 may include the first host computer sending a message to the second host computer that an edge detection event occurred. In response, the second host computer may determine where its corresponding cursor (e.g., cursor 950) should originate (e.g., location 949) and how it should travel (e.g., speed, direction, acceleration) until control signals from the input device are received (e.g., after channel switching and pairing). That is, the second host computer may move its cursor 950 along a calculated artificial trajectory (e.g., calculated by software 902) based on the trajectory of cursor 940 until control signals from input device 930 are received by the second host computer (e.g., at location 952). Cursor control for cursor 950 then continues from location 952 under normal operating conditions (i.e., cursor movement via control signals from the input device) for what appears to the user to be a smooth and uninterrupted movement of a single cursor between host computers (e.g., host 910 to host 920).

It should be appreciated that the specific steps illustrated in FIG. 10 provide a particular method 1000 for cursor trajectory-based delay compensation in a flow-enabled system, according to certain embodiments. Other sequences of steps may also be performed according to alternative embodiments. For example, alternative embodiments may perform the steps outlined above in a different order. That is, certain embodiments may send an edge detection notification to other host computers before sending a control signal to automatically switch channels on a corresponding input device. In other embodiments, both method steps 1030 and 1040 may occur substantially simultaneously (e.g., within 5 ms of each other). Moreover, the individual steps illustrated in FIG. 10 may include multiple sub-steps that may be performed in various sequences as appropriate to the individual step. Furthermore, additional steps may be added or removed depending on the particular applications. Control signals can be referred to in any convenient manner to clarify one control signal from another. For example, terms like "first control signal," "second control signal," or "third control signal," and the like, can be used to identify and/or explain a particular control signal. One of ordinary skill in the art would recognize and appreciate many variations, modifications, and alternatives of method 1000.

Switching Multiple Input Devices Between Host Computers

In some user system arrangements, multiple input devices may be communicatively coupled to a host computer. For example, several input devices (e.g., computer mouse, keyboard, etc.) and output devices (e.g., wireless speakers) may be associated with a first host computer. In some embodiments, flow software can allow a user to automatically switch multiple input and output devices. In some cases, it may not be necessary that the linked input/output devices be assigned to the same channels.

Figure 11:
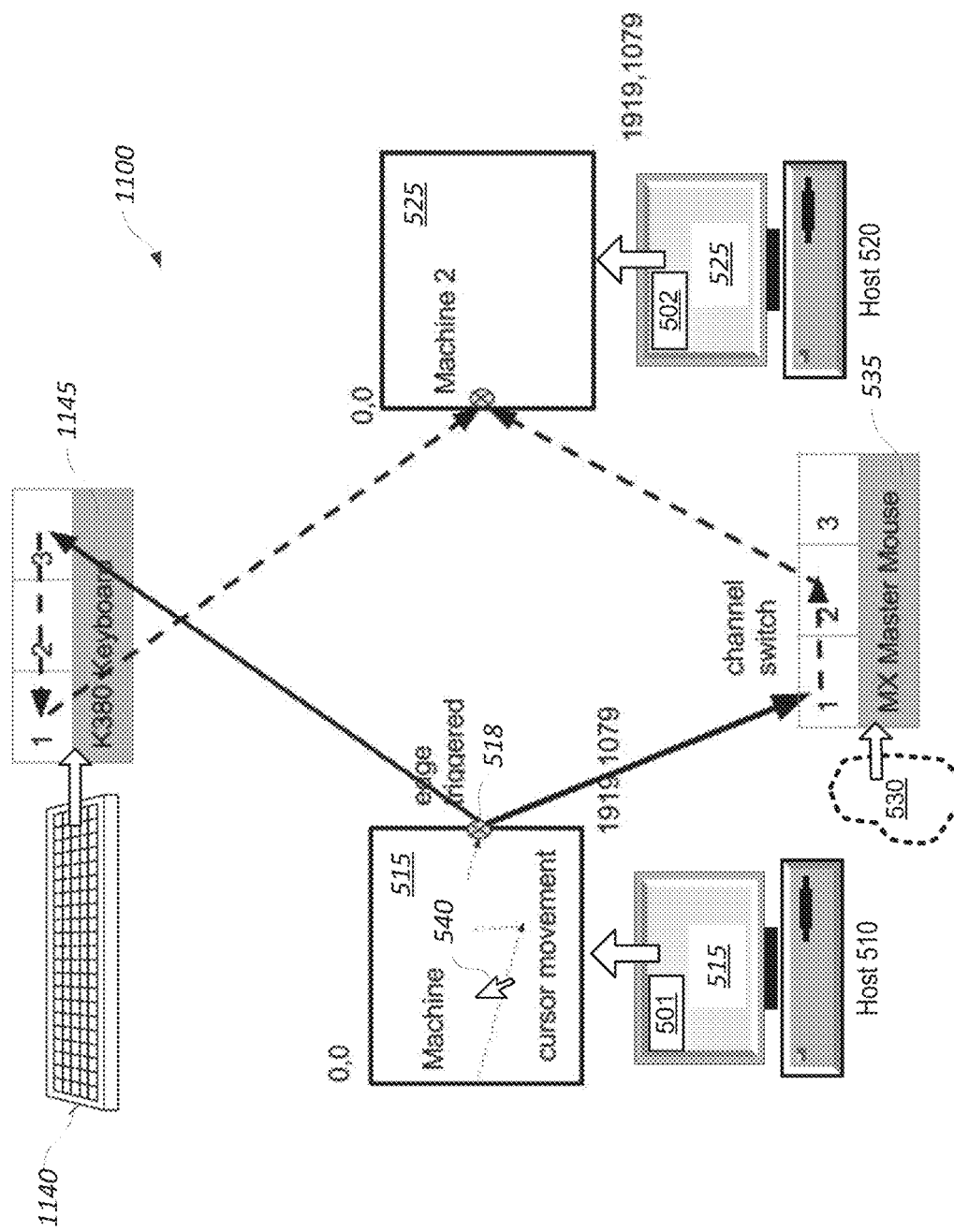
FIG. 11 shows a simplified block diagram of a system for automatically causing multiple input devices to switch between host computers in response to detecting an edge trigger event in a flow-enabled system, according to certain embodiments.

FIG. 11 shows a simplified block diagram of a system 1100 for automatically causing multiple input devices to switch between host computers in response to detecting an edge trigger event, according to certain embodiments. To simplify the analysis, FIG. 11 includes many similar system elements as system 500 of FIG. 5, with the addition of an additional input device (keyboard 1140) and corresponding multi-channel switch 1145. It should be noted that any number of input and/or output devices may be associated with any number of host computing devices, as would be appreciated by one of ordinary skill in the art.

Multi-channel switch 535 can be switched between three user programmable channels. In some embodiments, channel 1 may cause input device 530 to be paired with host 510, channel 2 may cause input device 530 to be paired with host 520, and channel 3 may not be associated with any host computer (as shown). Any programmed configuration of the channels is possible.

Multi-channel switch 1145 for keyboard 1140 can be switched between three user programmable channels. Some input devices 1145 may have more or fewer channels. In some embodiments, channel 1 may cause input device 1140 to be paired with host 520, channel 2 may not be associated with any host computer (as shown), and channel 3 may cause input device 530 to be paired with host 510.

According to some embodiments, host 510 may indicate an edge trigger event when cursor 540 reaches edge 518 of display 515. Host 510 may then generate a control signal causing input device 530 (e.g., a Bluetooth computer mouse) to switch from channel 1 (host 510) to channel 2 (host 520) and initiate the "flow" process described above. Host 510 may further generate a second control signal causing input device 1140 (e.g., a Bluetooth keyboard) to switch from channel 3 (host 510) to channel 1 (host 520), as shown. Thus, two input devices are switched simultaneously, or substantially simultaneously (e.g., within 10 ms of each other) in response to an edge trigger event. In some embodiments, more input or output devices can be added and each device does not have to be on the same channel.

Input devices may each have separate software settings (e.g., via software 501, 502) with respect to switching between host computers. For instance, a computer mouse may incorporate aspects of delay compensation (see FIGS. 9-10), while a keyboard may not. In some cases, Bluetooth speakers may be paired to a first host (host 510) and may remain there in response to an edge trigger event. In this context, one of ordinary skill in the art would recognize many variations, modifications, and alternatives.

Figure 12:
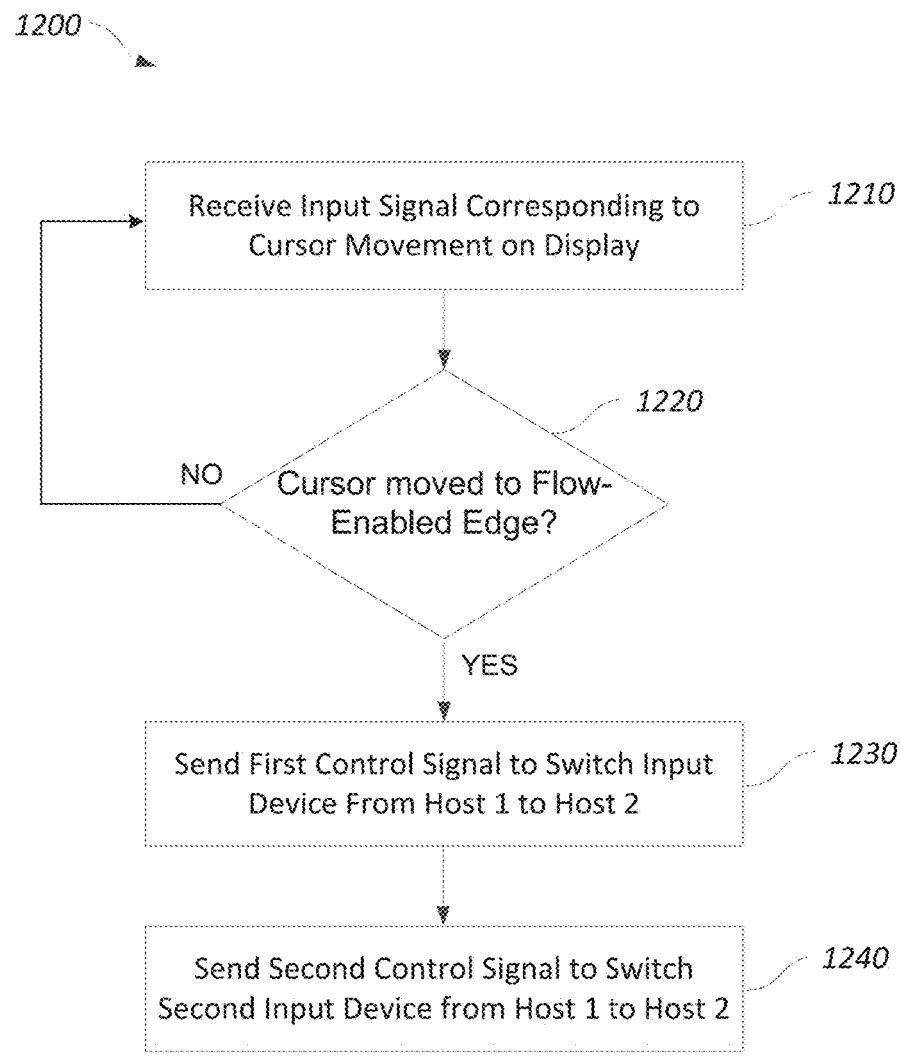
FIG. 12 shows a simplified method for automatically causing an multiple input devices to switch between host computers in response to detecting an edge trigger event in a flow-enabled system, according to certain embodiments.

FIG. 12 shows a simplified method 1200 for automatically causing an multiple input devices to switch between host computers in response to detecting an edge trigger event, according to certain embodiments. At step 1210, method 1200 may include receiving, by a first host computer (e.g., host 510), an input signal from an input device (e.g., input device 530) communicatively paired with the first host computer, the input signal corresponding to a movement of a cursor (e.g.,. cursor 540) on a display (e.g., display 515) of the first host computer.

At step 1220, method 1200 may include detecting, by the first host computer, when the cursor moves to an edge of the display of the first host computer and when the input signal corresponds to continued movement of the cursor beyond the edge of the display of the first host computer. In response to detecting that the cursor has moved to the edge of the display of the first host computer and that the input signal corresponds to a continued movement of the cursor beyond the edge of the display of the first host computer (i.e., "yes" condition at step 1220), method 1200 (at step 1230) can include sending, by the first host computer to the input device, a first control signal to switch the communicative pairing of the input device from the first host computer to a second host computer. Otherwise, method 1200 returns to step 1210 (i.e., "no" condition at step 1220). In certain embodiments, detecting when the cursor moves to an edge of the display of the first host computer can include detecting when the cursor overlaps one or more of a plurality of pixels defining the edge of the display.

At step 1240, method 1200 can include sending, by the first host computer to a second input device (e.g., keyboard 1140), a second control signal to the second input device communicatively paired with the first host computer to switch the communicative pairing of the second input device from the first host computer to the second host computer. In some embodiments, the first and control signals can be sent in any order or simultaneously. The input device can be a computer mouse. The second input device can include a keyboard, speaker, microphone or the like. The first host computer can be communicatively coupled to the second host computer via a local-area network (LAN), cloud-based network, or any suitable interconnected network allowing communication between the first and second host computers.

Alternatively or additionally, method 1200 can include sending, by the first host computer to the second host computer, a third control signal causing a processor in the second host computer to move a second cursor on a display of the second host computer to a location to simulate a continuous movement of the cursor from the edge of the display of the first host computer to a corresponding edge of the display of the second host computer. Some embodiments may include sending, by a first host computer (e.g., host 910) to a second host computer (e.g., host 920), cursor location and projectile data corresponding to a cursor (940) movement on the first host computer to better simulate the cursor "flow" movement between host computers, as discussed above at least with respect to FIG. 9. The first and second host computers (including additional host computers) may communicate via a shared network connection (e.g., TCP/IP) at any suitable frequency (e.g., periodic or continuous cursor updates). The first input device can be a computer mouse. The second input device can be one of a keyboard, speaker, microphone, or the like. The first and second input devices can be communicatively paired to the first host computer or the second host computer via a wireless communications protocol including one of Bluetooth, Bluetooth LE, infra-red (IR), ZigBee, Ultra Wideband, or RF.

It should be appreciated that the specific steps illustrated in FIG. 12 provide a particular method 1200 for cursor trajectory-based delay compensation in a flow-enabled system, according to certain embodiments. Other sequences of steps may also be performed according to alternative embodiments. For example, alternative embodiments may perform the steps outlined above in a different order. That is, certain embodiments may send an edge detection notification to other host computers before sending a control signal to automatically switch channels on a corresponding input device. In other embodiments, both method steps 1230 and 1240 may occur substantially simultaneously (e.g., within 5 ms of each other). Moreover, the individual steps illustrated in FIG. 12 may include multiple sub-steps that may be performed in various sequences as appropriate to the individual step. Furthermore, additional steps may be added or removed depending on the particular applications. For instance, some embodiments may only require that the cursor has moved to the edge of the display of the first host computer (i.e., and not require that the input signal corresponds to a continued movement of the cursor beyond the edge of display) to cause the first host computer to send the first, second, and third control signals. One of ordinary skill in the art would recognize and appreciate many variations, modifications, and alternatives of method 1200.

Sharing Virtual Clipboard Data Between Host Computers

In addition to switching cursor control on a first host computer to a second host computer, automatic multi-host switching can provide additional functionality including the transfer of user data. In some embodiments, a user may move virtual clipboard (VC) data on a virtual clipboard of a first host computer and make it available (e.g., for pasting) on a second host device. Any type of VC data can be transferred including alphanumeric text, symbols, documents, media (e.g., audio, video), files (e.g., .doc, .xls, .exe, .rar, .gif, etc.), and the like. An edge-triggered transfer of data between two host computers can appear to be seamless and immediate from a user perspective, thus providing even greater flexibility and additional functionality beyond switching input devices between host computers.

Figure 13:
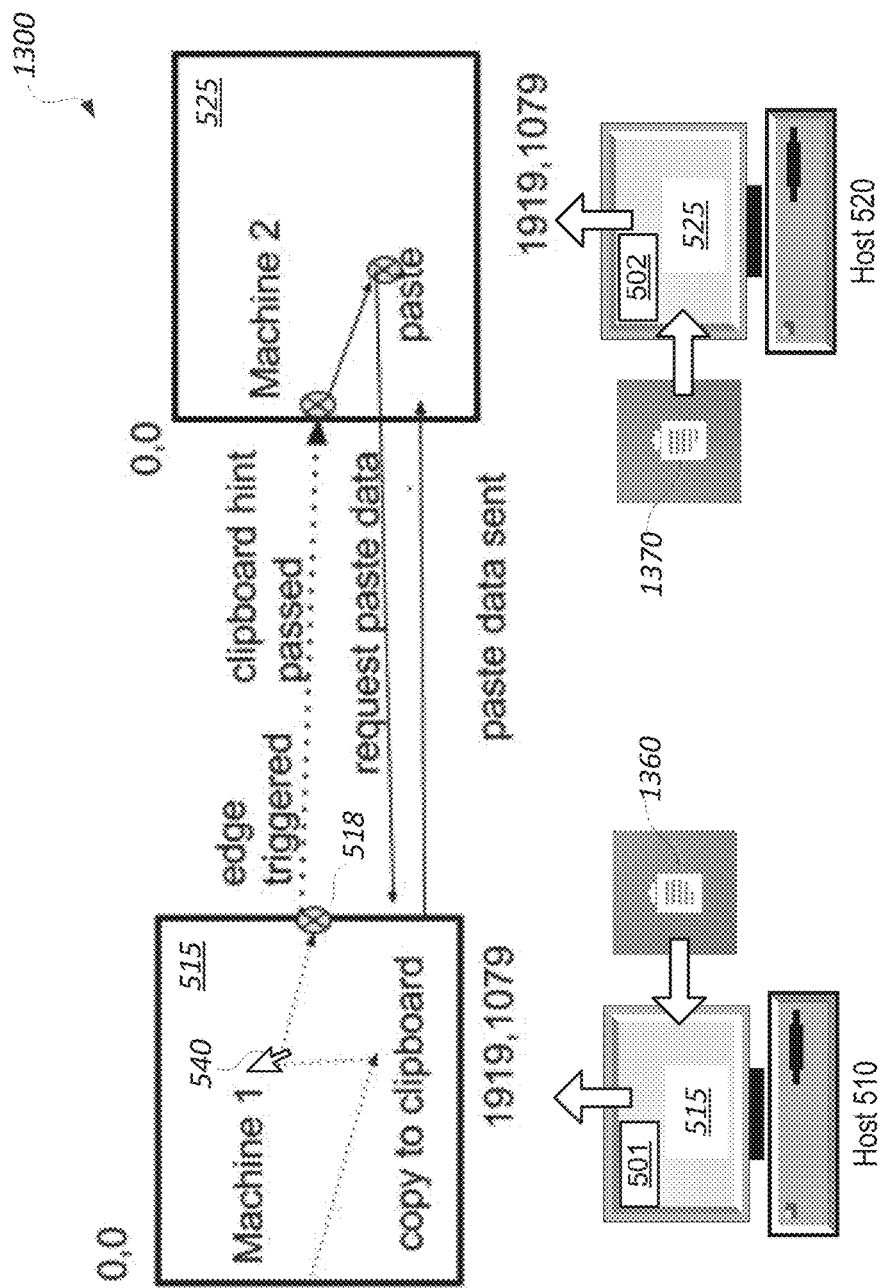
FIG. 13 shows a simplified block diagram of a flow-enabled system for transferring data between host computers in response to an edge trigger event, according to certain embodiments.

FIG. 13 shows a simplified block diagram of a flow-enabled system 1300 for transferring data between host computers in response to an edge trigger event, according to certain embodiments. To simplify the analysis, FIG. 13 includes some similar system elements as system 500 of FIG. 5 and additional elements including virtual clipboard 1360 associated with host 510, and virtual clipboard 1370 associated with host 520. Furthermore, certain edge trigger steps are not discussed in detail (e.g., input device channel switching) to maintain focus on aspects of data and file transfer between systems, which can be applied to any of the embodiments explicitly and implicitly supported throughout this document.

In response to cursor 540 moving to edge 518 of display 515, software 501 of host 510 can initiate an edge trigger event. In addition to causing automatic host switching on a paired input device (e.g., input device 530—see FIG. 5), software 501 of host 501 can send a message to software 502 of host 520 indicating that virtual clipboard 1360 includes data available to copy. The message can be of any suitable type or format (e.g., a flag) that can provide a hint or indication to the input device receiving host computer (following an edge trigger event) that virtual clipboard 1360 has stored data. Typically, a virtual clipboard may define a format of a type of content on the clipboard. For instance, in flow software (e.g., SW 102), copying and pasting of virtual clipboard data is supported. Some supported virtual clipboard formats include, but are not limited to, text files (e.g., plain text, rtf, etc.), image files (e.g., x-win-dibv5, png, tiff, bmp, jpeg, gif, etc.), video files (e.g., mpeg, mov, etc.), audio files (e.g., .wav, mp3, etc.), executable files, document files (.doc, .xls, .ppt, etc.), and the like.

Host 520 can receive the hint that VC data is available on virtual clipboard 1360. A user may then access that VC data at any time thereafter while operating on host 520. When a user decides to access or paste the VC data, host 520 (via software 502) can request the VC data from virtual clipboard 1360 on host 510. In response, host 510 transfers the VC data from virtual clipboard 1360 to virtual clipboard 1370 on host 520, and the user may complete the paste operation. From a user perspective, the process is very fast (e.g., typically under 500 ms) and provides what appears to be a simple copy/paste operation, but over two separate host computers. The transferring of hint data or VC data can be performed over the network link (e.g., TCP/IP connection), as further discussed above with respect to FIG. 2.

In some embodiments, transferring the VC data between hosts may not remove the VC data from the original virtual clipboard. For example, in a network of four host computers, a first host computer having VC data may transfer said VC data to one or more of the other three host computers without necessarily deleting it from its virtual clipboard, which may be a common result in conventional copy/paste operations on a single operating system (e.g., MS Windows).

FIG. 13 shows how some embodiments first provide a hint to the other host computer(s) indicating that VC data is available before actually sending the data. This may be preferred, as some virtual clipboards may have very large amounts of data and the user may not want to utilize otherwise available bandwidth on the local network. This could be more pronounced with larger numbers of flow-enabled host computers are networked that may share the contents of their respective virtual clipboards.

In some embodiments, host computers may share VC data between some or all machines in a network without first requiring a request from a host computer. In some cases, VC data can be shared at any suitable interval (e.g., periodically, continuously) and not necessarily in response to an edge trigger event, similar to the transfer of cursor location data and projectile data between host devices, as discussed above with respect to FIGS. 9-10.

Figure 14:
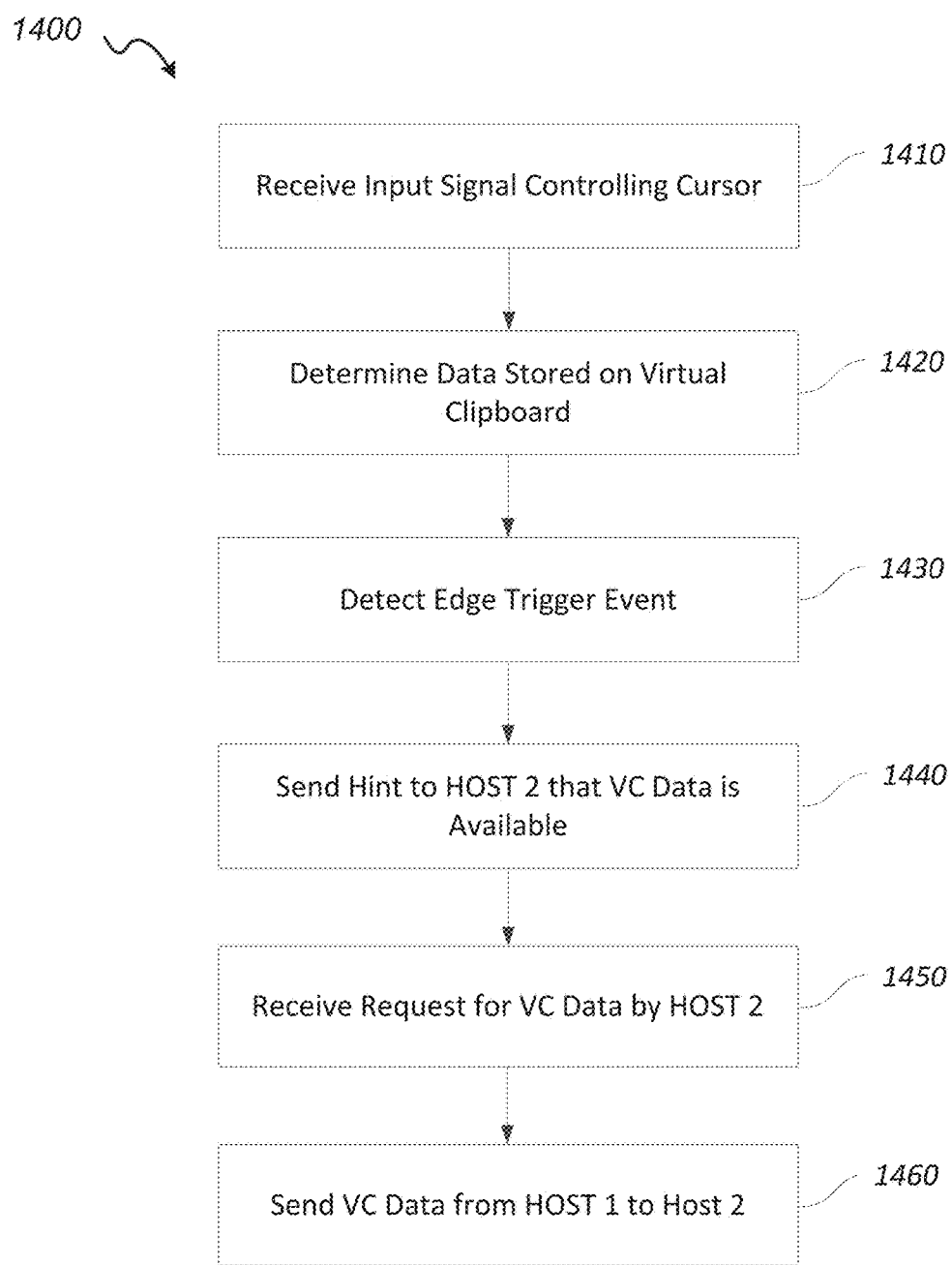
FIG. 14 shows a simplified method for transferring data between host computers in a flow-enabled system in response to an edge trigger event, according to certain embodiments

FIG. 14 shows a simplified method 1400 for transferring data between host computers in a flow enabled system in response to an edge trigger event, according to certain embodiments. At step 1410, method 1400 can include receiving, by a first host computer (e.g., host 510), an input signal from an input device (e.g., input device 530) communicatively paired with the first host computer, the input signal corresponding to a movement of a cursor (e.g.,. cursor 540) on a display (e.g., display 515) of the first host computer. The first host computer can be communicatively coupled (e.g., via TCP/IP protocol) to a second host computer on a network (e.g., LAN, WAN, cloud-based network, or any communicatively interconnected arrangement between host computers).

At step 1420, method 1400 can include determining, by the first host computer, that data is saved to a virtual clipboard. Alternatively or additionally, method 1400 can include storing data on a virtual clipboard (e.g., virtual clipboard 1260) of a first host computer (e.g., host computer 510). The data (i.e., VC data) may be of any type including alphanumeric text, symbols, documents (e.g., .xls, .word, .ppt, etc.), media (e.g., audio, video), data files (e.g., .doc, .xls, .exe, .rar, .gif, etc.), or the like. In some embodiments, a screen capture on a display of a first host computer can be sent to a remote second host computer in response to a flow event on the first host computer (e.g., edge trigger event). In some embodiments, a flow event can be programmed by a user to perform multiple tasks (e.g., host switching, virtual clipboard transfer, etc.). The VC data can be stored on the first host computer, on the input device (e.g., stored in a computer mouse and accessible (retrievable) by any host computer), or any host-computer-accessible location (e.g., in the cloud), as would be understood by one of ordinary skill in the art.

At step 1430, method 1400 may include detecting an edge trigger event, as shown and described above at least with respect to FIG. 5. In some embodiments, an edge trigger event may include detecting, by the first host computer, when the cursor moves to an edge of the display of the first host computer and/or when the input signal corresponds to continued movement of the cursor beyond the edge of the display of the first host computer.

At step 1440, in response to detecting that the cursor has moved to the edge of the display of the first host computer and that the input signal corresponds to a continued movement of the cursor beyond the edge of the display of the first host computer, method 1400 may include sending a hint (e.g., control signal, flag, message, alert, etc.) to a second host computer (e.g., host computer 520) indicating that VC data is available (e.g., stored on a virtual clipboard of the first host computer, input device, etc.).

At step 1450, method 1400 may include receiving a request for the VC data by the second host computer. At step 1460, method 1400 may include sending the VC data by the first host computer to the second host computer via the shared network connection (e.g., TCP/IP network). In some embodiments, the first host computer may store and send the VC data. Alternatively or additionally, the VC data may be stored on the input device or other external location (e.g., a third host computer that is first host computer-accessible) and the first host computer may first retrieve the VC data and then send it to the second host computer. In some cases, the first host computer may coordinate a transfer of the VC data to the second host computer without first receiving it. One of ordinary skill in the art would understand the many variations, modifications, and alternative embodiments thereof.

In some embodiments, the hint data (e.g., flag, message, etc.) may include additional information that describes the VC data. For instance, the hint data may indicate how many files are on the virtual clipboard, what types of files (e.g., .doc, .xls, .mp3, .wav, .mov, etc.), file size, file date (time/date when saved), or other meta data, as would be recognized by one of ordinary skill in the art.

It should be appreciated that the specific steps illustrated in FIG. 14 for transferring data between host computers in a flow enabled system in response to an edge trigger event, according to certain embodiments. Other sequences of steps may also be performed according to alternative embodiments. For example, alternative embodiments may perform the steps outlined above in a different order. Moreover, the individual steps illustrated in FIG. 14 may include multiple sub-steps that may be performed in various sequences as appropriate to the individual step. Furthermore, additional steps may be added or removed depending on the particular applications. For example, some embodiments may transfer VC data between hosts without first sending a hint message. One of ordinary skill in the art would recognize and appreciate many variations, modifications, and alternatives of method 1400.

Launching and Synchronizing Software Applications Between Host Computers

In some embodiments, an edge-triggered flow event on a first host computer can be used to cause other host computers to launch an application and synchronize aspects of the launched application with the first host computer. In some aspects, launching and synchronizing may be performed in anticipation of an edge-triggered flow event (see, e.g., FIG. 9 for anticipation of an edge-triggered flow event). For example, in response to determining that a cursor on a display of a first host computer is approaching a flow-enabled edge while dragging an active software application or program (e.g., operating in a window), the first host computer can send a control signal to cause a processor(s) on the second host computer to initiate the same software application or program operating on the first host computer in anticipation of an edge trigger event. Initiating the software program can include, for example, running the software program in the background, beginning authentication procedures for the software application, or launching the software application and mirroring input from the software application running on the first host computer. For instance, in some embodiments, if a user has a website window open in an internet browser, (e.g., Google Chrome®) on a display of a first host computer and begins to drag the website window toward or at a flow-enabled edge, another internet browser may launch on the second host computer to the same website window displayed on the first host computer.

In certain embodiments, an edge-triggered event may occur when a user selects an application window with a cursor and drags the window to a flow-enabled edge on the first host computer. The edge-trigger event may occur in response to the application window overlapping a row or column of pixels defining a flow-enabled edge on the display of the first host computer. In some embodiments, an edge-triggered event may occur in response to the application window moving beyond the flow-enabled edge such that a portion of the window is not viewable on the first host computer. Some additional non-limiting examples include triggering an edge-triggered event in response to the application window moving beyond the flow-enabled edge and the cursor overlapping (with or without continued movement beyond the flow-enabled edge), the application window moving beyond the flow-enabled edge by a certain threshold amount (e.g., 50% overlapping, or any suitable threshold value), or any combination thereof as would be appreciated by one of ordinary skill in the art.

In certain embodiments, transferring data between host computers in a flow enabled system in response to an edge trigger event can include transferring software application data. For example, if a user has a software application running that is installed on both the first host computer and second host computer, as the window containing the software application is dragged to the edge of the display of the first host computer, the software application can be launched on the second host computer, thereby running the same software application simultaneously on the first host computer and second host computer. Continuing the example, as a user interacts with the software application on the first host computer, data from the software application based on the user's interactions on the first host computer may be sent to the software application on the second host computer, thereby mirroring actions performed by a user on a first host computer on a second host computer. User interaction data can include alphanumeric keyboard entries, computer mouse inputs affecting the software application operating on the first host computer, or the like. In some embodiments where two software application windows are running on two host computers (e.g., one software application window on the display of the first host computer and one software application window on the display of the second host computer), a visual indication may be added to one or both of the software application windows to identify which software application window is currently active. For example, an active software application window may change color, flash, be highlighted or marked, be associated with an audio or graphical cue, or the like, to notify the user which software application window is currently active.

FIG. 21A shows a simplified block diagram 2150 showing synchronized applications operating on separate host computers 910, 920 according to certain embodiments. Host computer 910 launches a web browser ("web browser 1") on display 915 and moves web browser 1 to a flow enabled edge, causing host 920 to launch web browser ("web browser 2") on display 925, as discussed above. In some embodiments, the web page and/or content on web browser 1 can be mirrored on web browser 2 (in addition to including projectile data as discussed above with respect to FIG. 9). For example, web browser 1 may be include data fields for a user to fill in information (e.g., name, age, account number, etc.). In some embodiments, web browser 2 can be open to the same website and may populate the same corresponding data fields as host computer 910 continuously or periodically sends the entered data to host computer 920, which can give the user the impression that entering data on an input device (e.g., input device 1140) is actually paired to both host computers 910, 920, when, in fact, it is paired to one host and the entered data from input device 1140 (or other input source) is transferred via an edge-triggered event in a flow-enabled system. In some implementations, there may be some delay between data entered on web browser 1 and displayed web browser 2 due, at least in part, to the delays discussed above with respect to FIG. 9. This is illustrated in FIG. 21A, which shows data entered on host computer 910 ("1 . . . 2 . . . 3 . . . ") and transferred to host computer 920 with a slight delay (". . . 1 . . . 2 . . . 3") as represented by the ellipses.

In some embodiments, a single software application window may be displayed on the displays of both the first host computer and second host computer simultaneously, such that the application window appears to straddle the displays of both host computers even through each software application is independently operated by each corresponding host computer, as shown in FIG. 21B (further discussed below). In this embodiment, transferring software application data from a first host computer to a second host computer may be related to the proportion of the software application window displayed on both the displays of the first host computer and second host computer. For example, if 25% of a software application window is displayed on the display of the first host computer, and 75% of a software application window (i.e., operated by the second host computer) is displayed on the display of the second host computer, the portion of the software application window displayed on the display of the second host computer can be considered active and the actions performed by a user in the software application window can be mirrored in the software application window on the display of the first host computer. If the window is then moved such that 70% of the software application window is displayed on the display of the first host computer and 30% of the software application window is displayed on the second host computer, then actions performed by the user in the application running on the first host computer can be mirrored (e.g., entered by the second host computer) in the software application window on the display of the second host computer.

FIG. 21B shows a simplified block diagram 2150 showing synchronized applications operating on separate host computers 910, 920, according to certain embodiments. Host computer 910 launches a web browser ("web browser 1") on display 915 and moves web browser 1 to a flow enabled edge, causing host 920 to launch web browser on display 925. In this example, an edge-triggered event on host computer 910 causes host computer 920 to open a web browser having the same web content, however web browser 1 appears to straddle both host computer 910 and host computer 920, despite being two separate instances of the web browser. That is, web browser 2 appears to be web browser 1. Projectile data can be used to synchronize both host computers 910, 920, to control the position of the separate web browsers to implement the "straddling" effect. In some cases, only a portion of a web page (e.g., left side of web page) may appear to be visible on host computer 910, and another portion (e.g., right side of web page) may appear to be visible host computer 920, as shown in FIG. 21B, despite being two independent instances of the web browser. The many uses, modifications, implementations, and variations that are possible would be understood by one of ordinary skill in the art with the benefit of this disclosure.

In certain embodiments, a window can be graphically emphasized or deemphasized to provide a user with a visual cue indicating which window is currently the "active" window. For example, if a first cursor (or cursor plus application window) on a display of a first host computer edge-triggers and "flows" to a display of a second host computer, the cursor (and/or application window) on the first host device can be deemphasized to show that cursor movement (and/or application window interactions) is no longer being controlled on the first host computer. The cursor and/or application window can be deemphasized by changing its color (e.g., grayed out), changing its brightness, sharpness, contrast, fading the cursor and/or application window, or any other suitable change to indicate non-active use. Continuing the example, the cursor and/or the application window on the second host computer becomes "active" and may be emphasized in any suitable manner including, but not limited to, changing color, changing brightness, causing the cursor and/or application window to flash continuously, periodically, or a finite number of times, or any other suitable indicator, as would be appreciated by one of ordinary skill in the art. The first host computer can send control signal to the second host computer to instruct the second host computer to emphasize the cursor and/or application window. Alternatively or additionally, the second host computer may initiate the emphasis on its own in response to receiving a "flow" action, as described above. Referring to FIG. 21B, most of the "straddled" web browser appears to be shown on host computer 920, which is graphically indicated as the "active" host computer by the color of the utility bar 2162. The web browser on host computer 910 is graphically indicated as the "inactive" host by the "grayed out" utility bar 2160. One of ordinary skill in the art would understand the many variations, modifications, and alternative embodiments thereof.

In further embodiments, a cursor and/or application window can be deemphasized by completely removing it from the non-active host computer. This can be performed in a number of different ways. For example, the first host computer (non-active) may take a screen shot of its display without the cursor and/or application window and overlay it on its display, thereby making it appear that the cursor and/or application window has disappeared, despite it still existing in an underlying layer. In some embodiments, software controls may be implemented that actually remove the cursor and/or application window in a non-active state, or change their color properties to make them appear invisible to a user during an non-active state. Those of ordinary skill in the art would understand the many variations, modifications, and alternatives that can apply.

In some embodiments, an edge-triggered event may cause an internet browser running on a first host computer to launch on a second host computer, but may not change the pairing of the input device from the first host computer to the second host computer. For example, a user may use an input device to control a cursor to select an internet browser window running on the first host computer and drag the window beyond a flow-enabled edge, being careful not to allow the cursor from reaching the flow-enabled edge. In some cases, this may still cause an internet browser window to launch in the second host computer, but may keep the input device associated with the first host computer. In some aspects, two or more input devices may be configured to "flow" between devices based on different criteria. For example, a first input device (e.g., computer mouse) may flow from a first host computer to a second host computer when the cursor reaches and/or input data is received to move the cursor beyond the flow-enabled edge, while a second input device (e.g., keyboard or speaker set) may flow when an application window is moved beyond the flow-enabled edge. In the present example, a keyboard (i.e., second input device) remains associated with the first host computer. In some cases, cursor trajectory data (see, e.g., FIG. 9) can be used to open the second browser window in a location on the display of the second host computer to make the first and second browser windows to appear to be the same window straddling the first and second displays and data can be shared between host computers (e.g., via a TCP/IP network connection). For example, if a user begins to type a uniform resource locator (URL) in the straddled browser window on the first host computer, but the URL is too long to see on the cut-off browser window, the URL entry can be shared with the second host computer (i.e., place in the same data entry field) to make it appear to be the same URL entry, despite that separate URL entries are being contemporaneously entered into both URL fields on the separate internet browsers.

Figure 15:
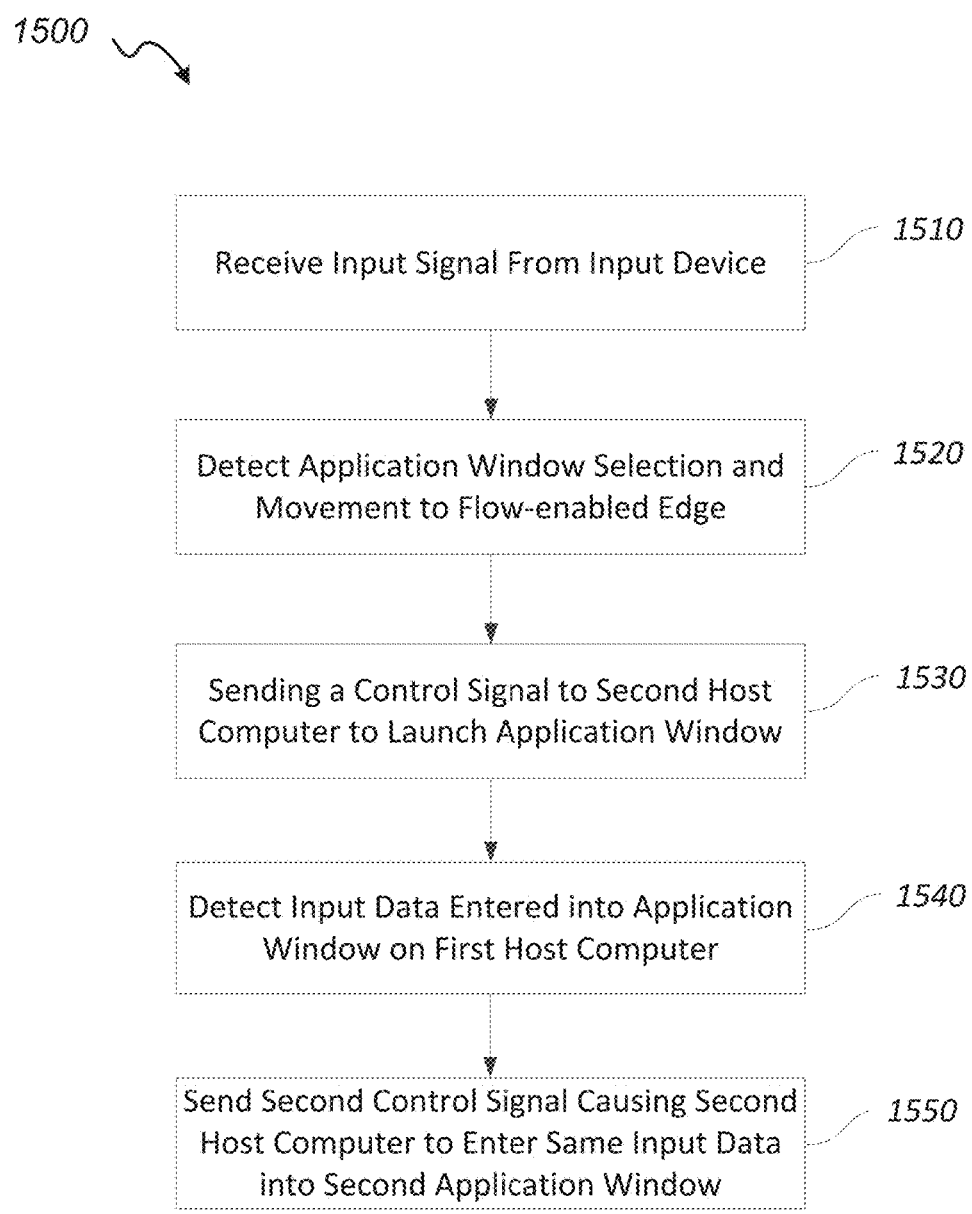
FIG. 15 shows a simplified method for launching and synchronizing software applications between host computers, according to certain embodiments.

FIG. 15 shows a simplified method 1500 for launching and synchronizing software application between host computers, according to certain embodiments. At step 1510, method 1500 can include receiving, by a first host computer, an input signal from an input device communicatively paired with the first host computer, the input signal corresponding to a movement of a cursor on a display of the first host computer, where the first host computer is communicatively coupled to a second host computer.

At step 1520, method 1500 can include detecting, by the first host computer, when the cursor selects and moves an application window to an edge of the display of the first host computer and/or when the input signal corresponds to continued movement of the selected application window beyond the edge of the display of the first host computer. The application window may run a corresponding software application (e.g., internet browser, word processing document, spreadsheet document, etc.).

At step 1530, method 1500 can include that, in response to detecting the cursor having moved the application window to the edge of the display of the first host computer and/or when the input signal corresponds to a continued movement of the selected application window beyond the edge of the display of the first host computer, method 1500 includes sending, by the first host computer to the second host computer, a control signal causing a processor in the second host computer to launch a second application window running a second corresponding software application on a second display of the second host computer. In some cases, the second corresponding application can be the same as the software application running on the first application window.

At step 1540, method 1500 can include detecting, by the first host computer, input data entered into the application window on the display of the first host computer. At step 1550, method 1500 can include sending, by the first host computer to the second host computer, a second control signal causing the processor in the second host computer to enter the input data into the second application window on the second display of the second host computer.

It should be appreciated that the specific steps illustrated in FIG. 15 for launching and synchronizing software application between host computers, according to certain embodiments according to certain embodiments. Other sequences of steps may also be performed according to alternative embodiments. For example, alternative embodiments may perform the steps outlined above in a different order. Moreover, the individual steps illustrated in FIG. 15 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 1500.

Cloud-Based Discovery of Host Computing Devices

Certain flow-enabled systems are not limited to local networks, and some may exist over many diverse network domains (e.g., WAN, VPN, 3G, 4G, LTE, Enterprise, etc.). The discovery operations can be similar to the LAN-based networks described above with respect to FIG. 2, with the addition of a cloud-based server in lieu of a typical UDP/TCP discovery and network connection.

Figure 16:
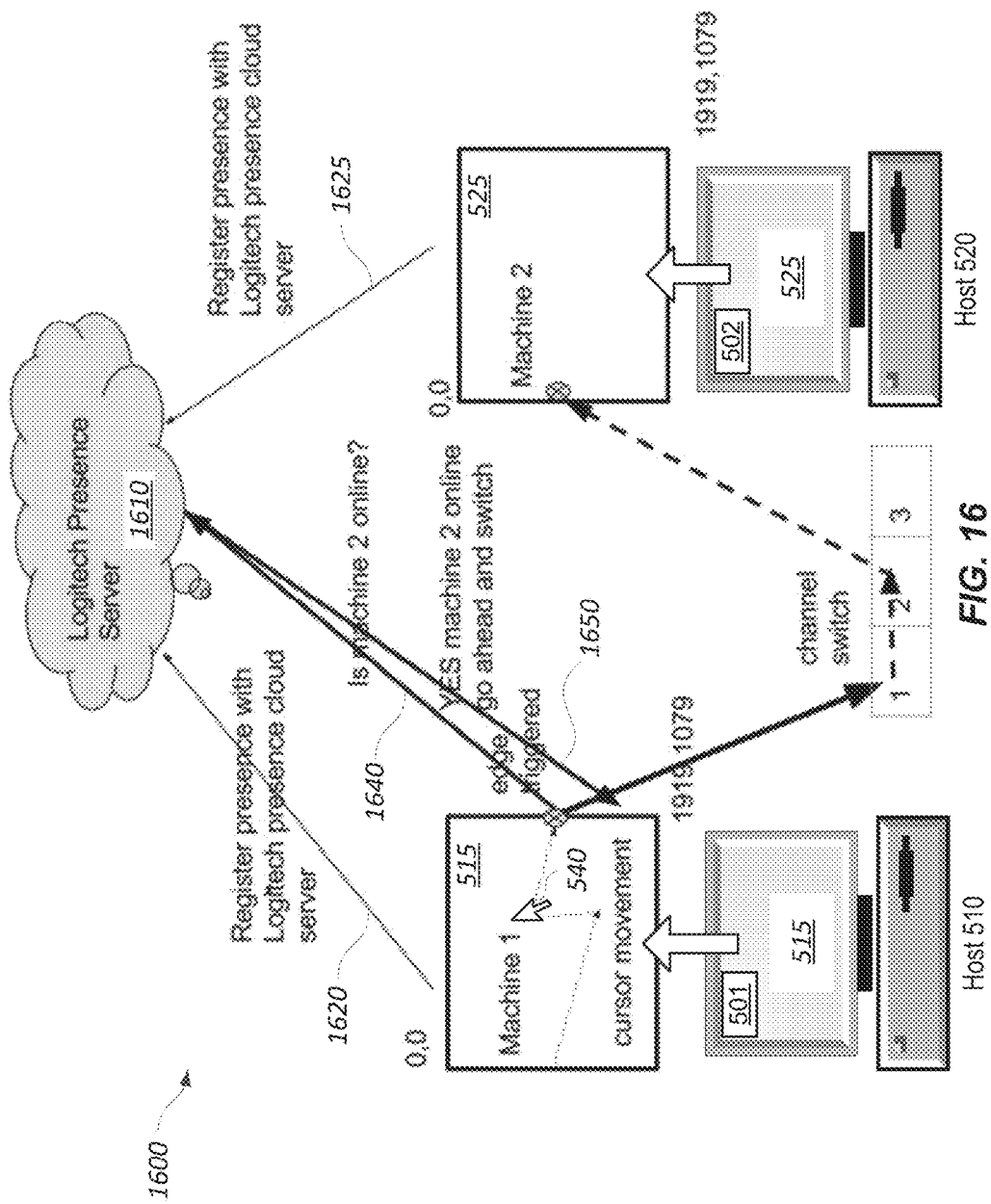
FIG. 16 shows a cloud-based flow-enabled system for automatic multi-host switching, according to certain embodiments.

FIG. 16 shows a cloud-based flow-enabled system 1600 for automatic multi-host switching, according to certain embodiments. To simplify the analysis, FIG. 16 includes some similar system elements as system 500 of FIG. 5 and additional elements including cloud-based presence server 1610. Host computer discovery can query multiple network domains to find, e.g., an input device model and serial number to find which hosts share the input device. This can allow flow operations (e.g., automatic multi-host switching) to take place irrespective of the network that a user is connected to. One primary difference is that instead of a LAN, a cloud-based server is used to transfer control signals, data, etc., between host devices.

For example, first host computer 510 and second host computer 520 can register 1620, 1625 the device model and serial number of input device 530. Host computer 510 can then query 1640 presence server 1610 to determine if other host computers are online (e.g., host computer 520). Once each host computer is aware of the other host computers on the one or more networks and their corresponding settings (e.g., input device settings, network details (network name, type, etc.)), then edge triggering and multi-host switching can begin 1650, as shown in FIG. 16, and further discussed above. Any of the other flow features described above (e.g., virtual clipboard sharing, multiple input device switching, cursor trajectory compensation, etc.) can be implemented in cloud based systems with the primary difference being the path of communication between host machines.

Figure 22:
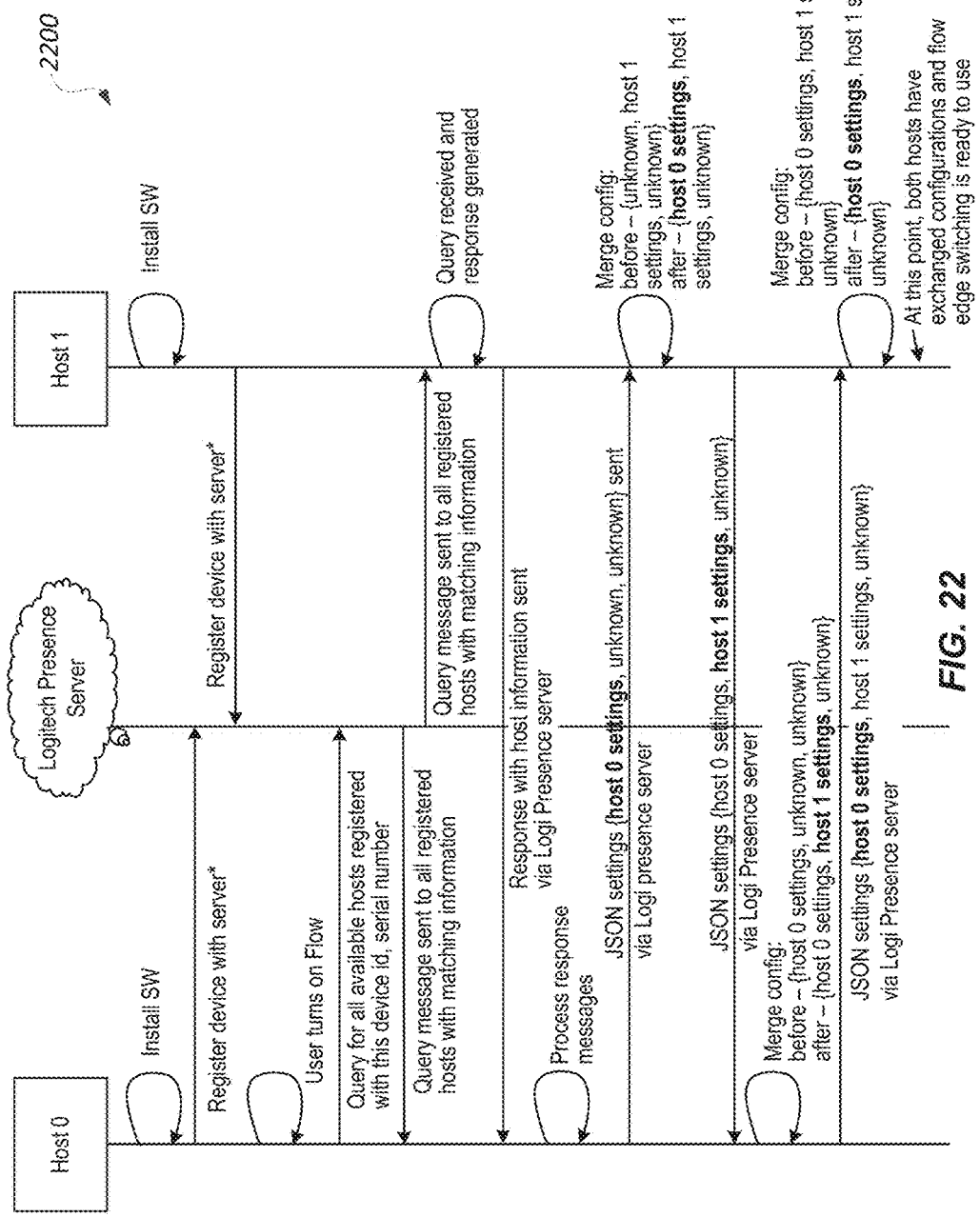
FIG. 22 is a sequence diagram showing an auto-discovery process of hosts on a subnet, according to certain embodiments.

FIG. 22 is a sequence diagram 2200 showing an auto-discovery process of hosts on a subnet, according to certain embodiments. Specifically, the auto-discovery process includes determining, by a first host coupled to an input device, if other hosts on a cloud-based network are also coupled to the input device. Once the other hosts are discovered, a direct communications link can be established between the hosts and automatic multi-host switching can begin. Sequence diagram 2200 can be performed, e.g., by corresponding software 501, 502 for each host computer 510, 520. One of ordinary skill in the art would understand the many variations, modifications, and alternative embodiments thereof.

Figure 23:
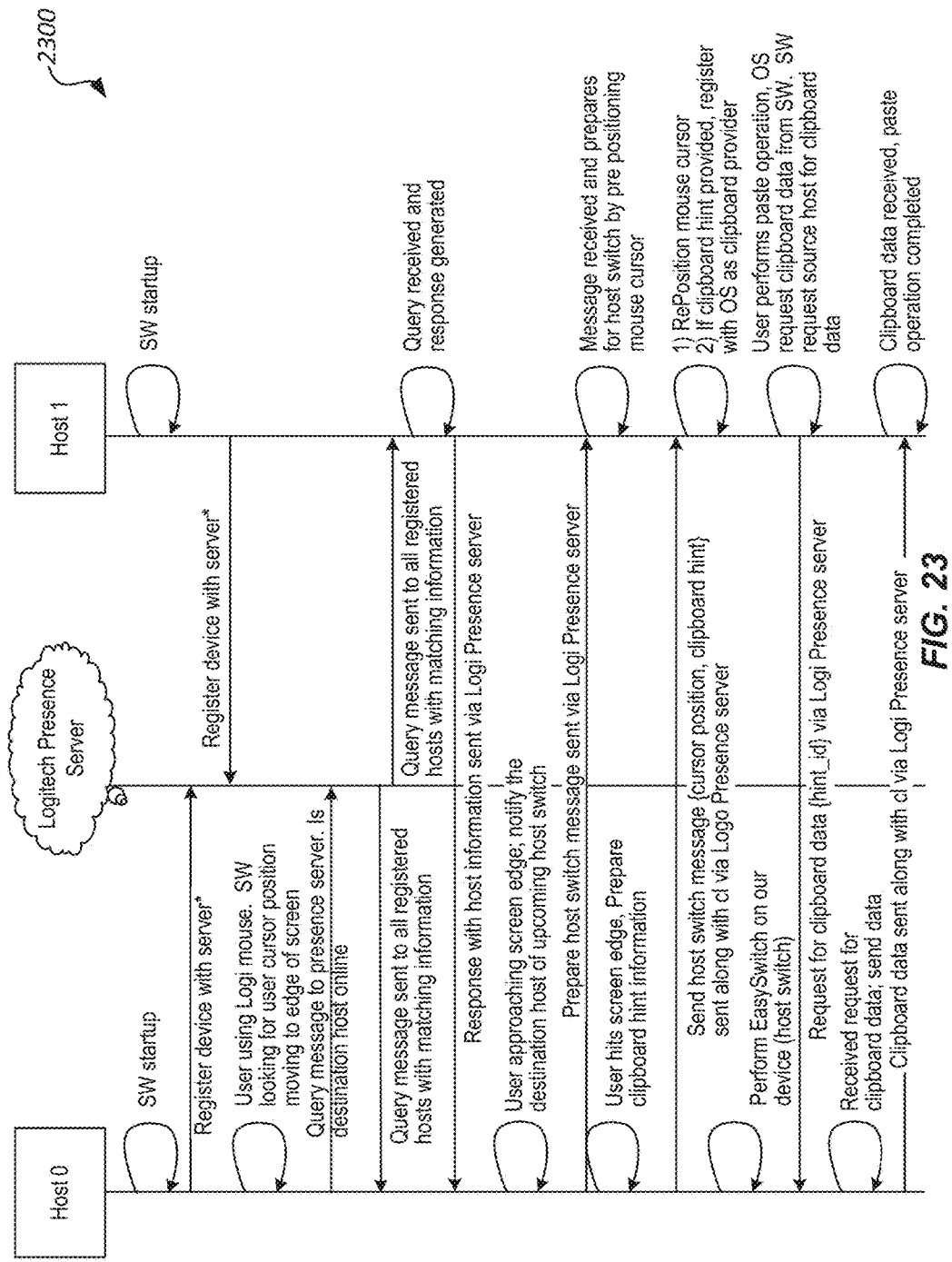
FIG. 23 is a sequence diagram showing a computer host switch and copy/paste process via a cloud-based network, according to certain embodiments.

FIG. 23 is a sequence diagram 2300 showing a computer host switch and copy/paste process via a cloud-based network, according to certain embodiments. Diagram 2300 illustrates how host computers are registered with a presence server, how host computers query the presence server to determine what other host computers are currently online and available for an edge-triggered event, and how host computers implement the flow-enabled event (e.g., input device switching, copy/paste action with VC data, flow-enabled computer application launch, multi-input device switching, etc., as discussed above). One of ordinary skill in the art would understand the many variations, modifications, and alternative embodiments thereof.

Dynamic Bridging In Flow-Enabled Systems

In some flow-enabled systems, three or more host computers may share an input device. When one host computer drops out of the network, the flow software (e.g., SW 501, 502) can dynamically reconfigure flow settings between online host computers to maintain the flow arrangement.

Figure 17A:
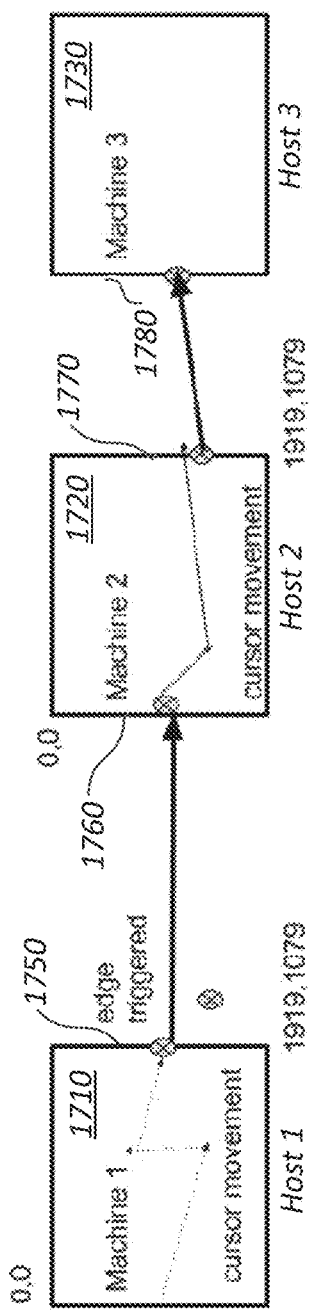
FIG. 17A shows a simplified block diagram of a flow-enabled multi-host system, according to certain embodiments.

FIG. 17A shows a simplified block diagram of a flow-enabled multi-host system, according to certain embodiments. To simplify the analysis, FIG. 17 includes some similar system elements as system 500 of FIG. 5, but are not shown. Specifically, the underlying infrastructure including individual host computers, input device(s) and channel selectors, flow software, and the like, are not depicted but are present to support the operation of displays 1710, 1720, 1730.

In FIG. 17A, display 1710 of Host 1 includes a flow-enabled edge trigger along edge 1750. Display 1720 of Host 2 includes flow-enabled triggers along edge 1760 and 1770.

Display 1730 of Host 3 includes a flow-enabled trigger along edge 1780. In operation, when a cursor is moved to edge 1750 of display 1710, control of one or more input devices may be switched from display 1710 to display 1720. Likewise, when a cursor is moved to edge 1760 of display 1720, control of one or more input devices may be switched from display 1720 to display 1710. When a cursor is moved to edge 1770 of display 1720, control of one or more input devices may be switched from display 1720 to display 1730. Likewise, when a cursor is moved to edge 1780 of display 1730, control of one or more input devices may be switched from display 1730 to display 1720.

Flow-enabled edges may be programmed by a user in any desired configuration. However, sometimes a host computer may be removed from the network, which may cause the overall system flow configuration to be placed in an unanticipated (not programmed) state. In certain embodiments, dynamic bridging can be used to auto-configure flow-enabled system to accommodate such changes in the system. For example, in FIG. 17B, when host 2 drops from the network, host 1 edge detection is reconfigured such that an edge detection can cause a corresponding input device to switch to host 3 instead of host 2. When host 2 comes back online, hosts 1 and 3 are notified (e.g., via their network connection) and the flow-enabled system auto-configures to reintroduce host 2 back into the arrangement shown in FIG. 17A. One of ordinary skill in the art would recognize the many variations, modifications, and reconfigurations that are possible in dynamic bridging in a flow-enabled system.

Figure 18:
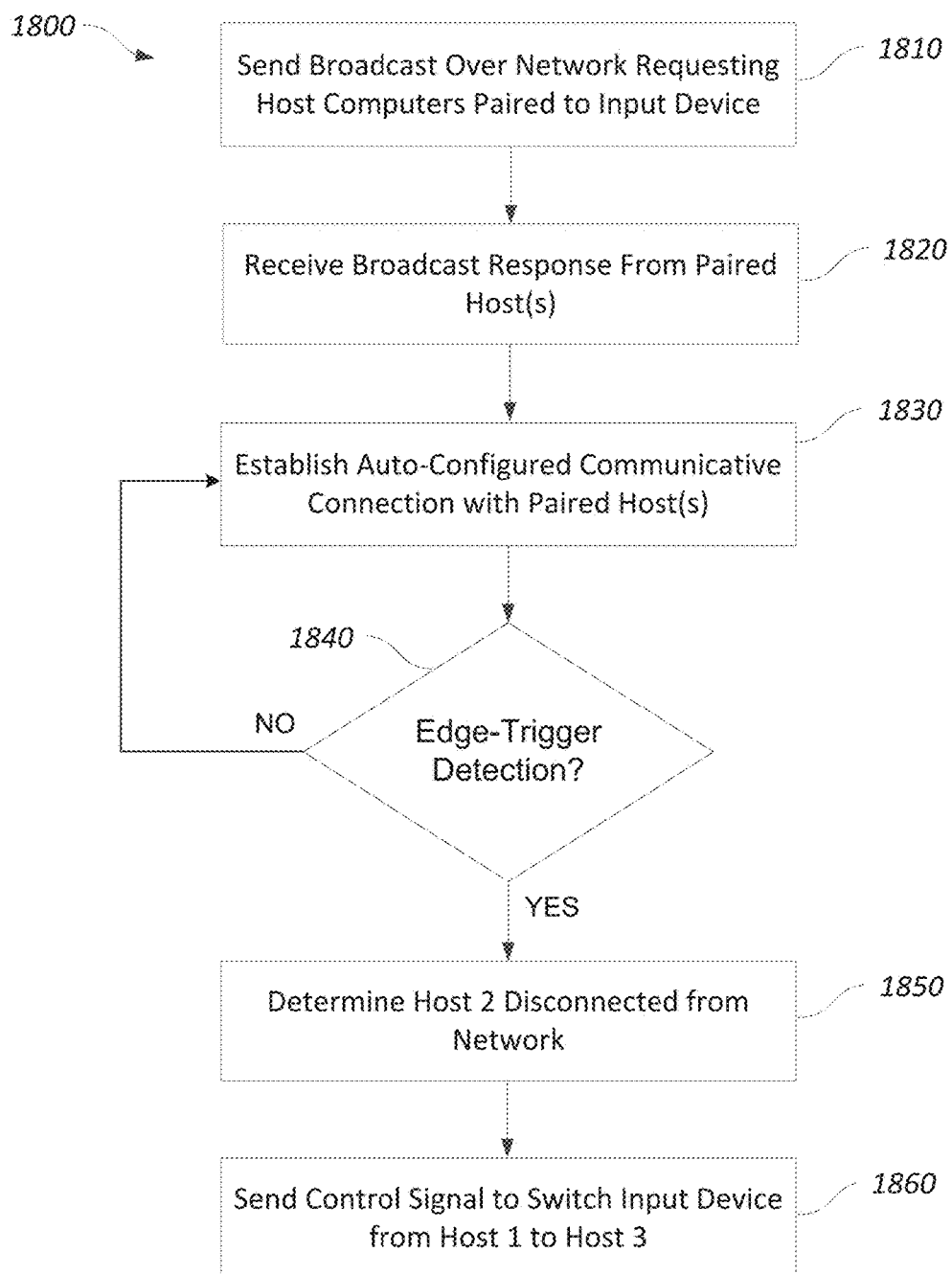
FIG. 18 shows a simplified method for dynamically bridging host computers in a flow-enabled network, according to certain embodiments.
Figure 19:
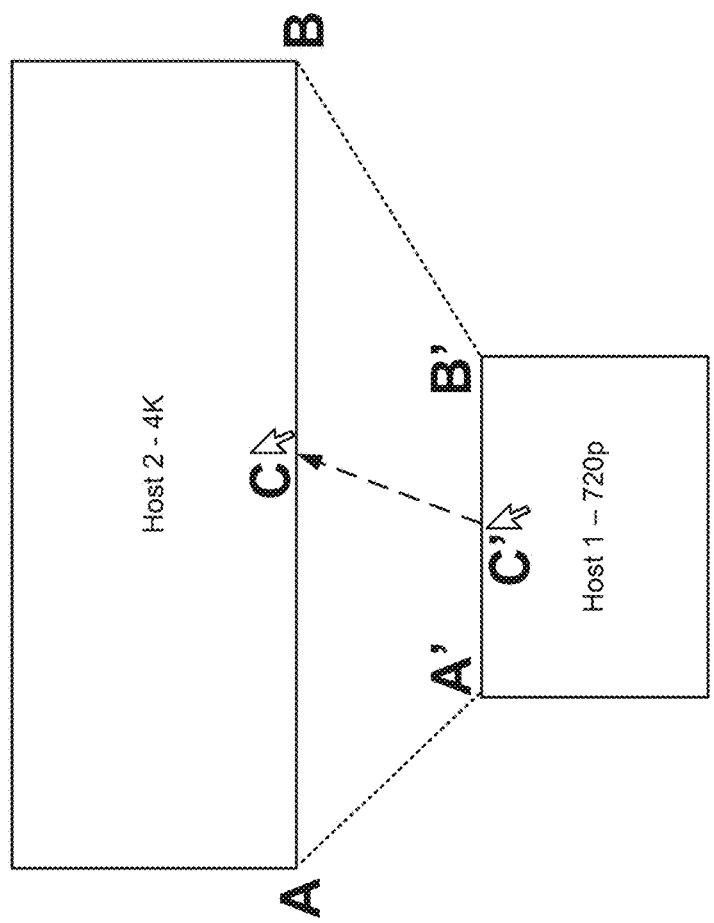
FIG. 19 shows a simplified block diagram of a flow-enabled multi-host system with displays having a differing size and resolution, according to certain embodiments.

FIG. 18 shows a simplified method 1800 for dynamically bridging host computers in a flow-enabled network, according to certain embodiments. At step 1810, method 1800 can include sending, by a first host computer communicatively paired with an input device (e.g., computer mouse), a broadcast over a network (e.g., UDP via a LAN) requesting a response from other host computers on the network that are also communicatively paired with the input device. The network can include any interconnected computing devices in a common network (e.g., LAN, WAN), different networks, or any combination thereof.

At step 1820, method 1800 can include receiving, by the first host computer, a broadcasted response from a second and third host computer on the network indicating that both the second and third host computers are communicatively paired with the input device.

At step 1830, method 1800 can include establishing, by the first host computer, a communicative connection (e.g., TCP/IP) with the second and third host computers via the network and automatically reestablishing the connection with either the second or third host computer as they disconnect and reconnect to the network. Automatically reestablishing the connection can include periodic, aperiodic, or continuous polling to determine if each host computer is connected or disconnected from the network and/or available for reconnection.

At step 1840, in response to detecting that a cursor controlled by the input device has moved to an edge (and/or beyond) of a display of the first host computer, method 1800 can include sending, by the first host computer to the input device, a first control signal to switch the communicative pairing of the input device from the first host computer to the second host computer (denoted "yes" in FIG. 18). Otherwise, method 1800 continues dynamically establishing and re-establishing connections with discovered host computers on the network (back to step 1830).

Figure 17B:
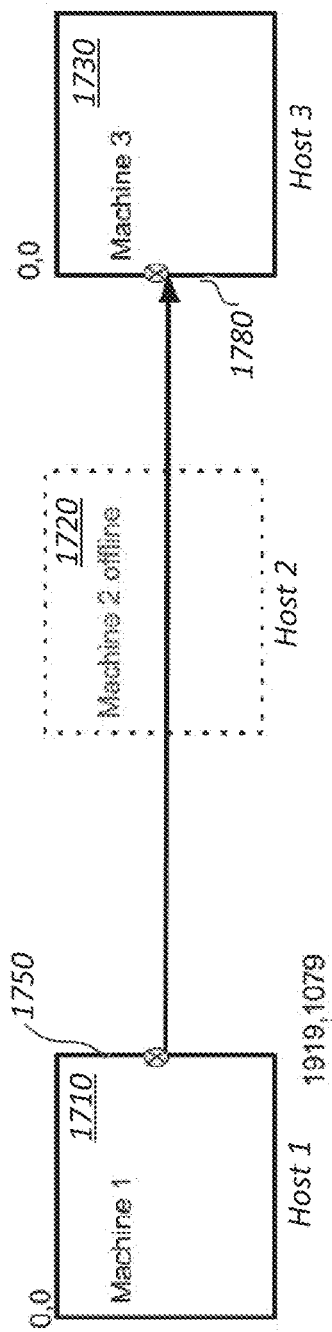
FIG. 17B shows a simplified block diagram of a flow-enabled multi-host system, according to certain embodiments.

At step 1850, in response to determining that the second host computer disconnected from the network, and detecting that the cursor on the first host computer has moved to the edge of the display, method 1800 can include sending, by the first host computer to the input device, a third control signal to switch the communicative pairing of the input device from the first host computer to the third host computer, as graphically illustrated in FIG. 17B.

It should be appreciated that the specific steps illustrated in FIG. 18 for dynamically bridging host computers in a flow-enabled network, according to certain embodiments. Other sequences of steps may also be performed according to alternative embodiments. For example, alternative embodiments may perform the steps outlined above in a different order. Moreover, the individual steps illustrated in FIG. 18 may include multiple sub-steps that may be performed in various sequences as appropriate to the individual step. Furthermore, additional steps may be added or removed depending on the particular applications. One of ordinary skill in the art would recognize and appreciate many variations, modifications, and alternatives of method 1800.

Cursor Positioning When Flowing Between Hosts

In some flow enabled systems, different host computers may use monitors having different resolutions and/or dimensions. Certain embodiments of the invention may take into account when determining where to place a cursor during a flow process between host computers. For example, in FIG. 19, the monitor endpoints A to A' and B to B' are mapped between a 720p monitor (Host 1) and a 4K monitor (Host 2) by corresponding flow software (e.g., SW 501), and a scaled entry point during a flow operation is calculated. One of ordinary skill in the art would recognize the many variations, modifications, and reconfigurations that are possible in multi-monitor a flow-enabled systems.

Advanced Flow Applications

In certain embodiments, flow-enabled systems may include gesture identification systems or eye/head tracking systems to initiate an edge trigger event. For example, if a user makes a hand motion that moves from the physical location of the first host computer to the second host computer, the gesture identification software, in response to the hand motion, may initiate an edge-triggered event. In another example, in response to a user turning his head (e.g., using a head tracking system) or moving his eyes from a display of a first host computer to a display of a second host computer, the head/eye tracking software may initiate an edge-triggered event.

In certain embodiments, flow-enabled systems may include gesture identification systems or eye/head tracking systems to initiate an edge trigger event. For example, if a user makes a hand motion that moves from the physical location of the first host computer to the second host computer, the gesture identification software, in response to detecting the hand motion, may initiate an edge-triggered event. In another example, in response detecting that a user is turning his head (e.g., using a head tracking system) or moving his eyes from a display of a first host computer to a display of a second host computer, the head/eye tracking software may initiate an edge-triggered event.

In head/eye tracking embodiments, a camera may be used by either the first host computer, second host computer, a third host computer, or a combination thereof, to follow a gaze of a user and initiate an edge-triggered event. The camera can include any suitable camera that can be connectable to a host computer. In certain embodiments, a camera can include any device with a built-in camera (e.g., mobile telephone, tablet, laptop computer) or external camera (e.g., web cam) connectable to a host computer through the transmission of a wireless communication signal, such as radio signal, infrared signal, ultrasonic signal, Bluetooth (BT), Bluetooth LE, Infrastructure Wireless Fidelity (WiFi), Soft Access Point (AP), Wifi-Direct, and NFC communication methods. In some embodiments, the camera and the host computers may communicate through a cloud-based network.

In head/eye tracking embodiments, the head/eye tracking software may perform an eye calibration process to customize edge-trigger thresholds for an individual user. The eye calibration process can include defining the edges of the screens (e.g., for an edge-triggered event) associated with the plurality of host computers (e.g., first, second, or third host computers). For example, a system can include a first host computer, second host computer, and third host computer, where the second host computer and third host computer are located on either side of the first host computer. A user can look at several different eye calibration indicators displayed in various areas on the screen of the first host computer to define the left and right edges of the screen of the first host computer to calibrate user eye tracking for detection of edge-trigger events. As discussed above, edge-triggered events can be associated with the other host computers in the network (e.g., second and third host computers).

In further embodiments, the eye calibration process can include determining a series of master-to-slave and slave-to-master relationships between multiple host computers. Determining the series of master-to-slave and slave-to-master relationships can include detecting and identifying a camera. In embodiments, a host computer connected to a camera as described above may be determined to be the master host computer and the remaining host computers may be determined to be the slave host computers. In other embodiments, when multiple host computers are individually connected to multiple cameras, a combination of master-to-slave relationships may be created.

For example, a first master-to-slave relationship may exist where the first host computer is a master host computer while the second and third host computers are slave host computers. A second master-to-slave relationship may exist where the second host computer is a master host computer while the first and third host computer are slave host computers, or any combination thereof. In embodiments where several sets of master-to-slave relationships have been created, if one host master computer goes offline, a former slave host computer can become the master host computer. For example, if a first master host computer goes offline, the second host computer may automatically switch from being a slave host computer to a master host computer.

In head/eye tracking embodiments with a first input device and a second input device paired with at least a first host computer and a second host computer, in response to detecting an edge-trigger event, initiating the "flow" process described above may include identifying a user action and inhibiting either the first input device or second input device from switching. A user action can include, but is not limited to, continuous use (e.g., minimal time between inputs, running software applications, streaming music, video calling) of the first or second input devices. In some embodiments, identifying a user action can include monitoring the number of keystrokes from a mouse or keyboard, monitoring the number of active applications and their respective processes, and the like. In further embodiments, determining a user action can be based on thresholds. For example, if the input device is a keyboard, a user action can be determined based upon a threshold amount of time between when a user presses the keys of the keyboard. In another example, if the input device is a speaker, a user action can be determined based upon a threshold amount of time a software application has been running or a threshold of processing power required to run the software application. In some embodiments, a threshold amount of time between key presses on a keyboard can be on the order of milliseconds, seconds, or minutes. A threshold amount of time for running a software application can be seconds, minutes, or any other suitable time frame. These threshold and others (e.g., amount of processing power required to run the software application) would be understood by one of ordinary skill in the art, who would appreciate the many variations, modifications, and alternative embodiments thereof.

For example, in a head/eye tracking flow enabled system with a first host computer and a second host computer, a user may have paired a mouse (e.g., a first input device) and keyboard (e.g., a second input device) with the first host computer. If the user is looking at the screen of the first host computer, is inputting data into an application running on the first host computer by typing on the keyboard, and subsequently, the user looks over at the screen of the second host computer while continuing to type on the keyboard, an edge-trigger detection may occur and the head/eye tracking flow enabled system may switch the pairing of the mouse from the first host computer to the second host computer while maintaining the pairing of the keyboard with the first host computer.

For another example, in a head/eye tracking flow enabled system with a first host computer and a second host computer, a user may have paired a mouse (e.g., a first input device) and speaker (e.g., a second input device) with the first host computer. If the user is looking at the screen of the first host computer, is streaming music through the speaker on the first host computer, and subsequently, the user looks over at the screen of the second host computer while continuing to stream music, an edge-trigger may occur and the head/eye tracking flow enabled system can switch the pairing of the mouse from the first host computer to the second host computer while maintaining the pairing of the speaker with the first host computer.

In yet another example, in a head/eye tracking flow enabled system with a first host computer and a second host computer, a user may have paired a mouse (e.g., a first input device) and webcam (e.g., a second input device) with the first host computer. If the user is looking at the screen of the first host computer, is having a video call using the webcam on the first host computer, and subsequently, the user looks over at the screen of the second host computer while continuing the video call, an edge-trigger may occur and the head/eye tracking flow enabled system can switch the pairing of the mouse from the first host computer to the second host computer while maintaining the pairing of the webcam with the first host computer.

In some embodiments, when an edge-trigger event is detected in response to a user moving their gaze from the screen of a first host computer to the screen of a second host computer and the cursor has not moved from the screen of the first host computer to the screen of the second host computer, the flow enabled system can utilize cursor location data described above to move the cursor in the same trajectory and direction as the gaze of the user from the screen of the first host computer to the screen of the second host computer.

Exemplary Computer Systems Implementing Embodiments Herein

Figure 20:
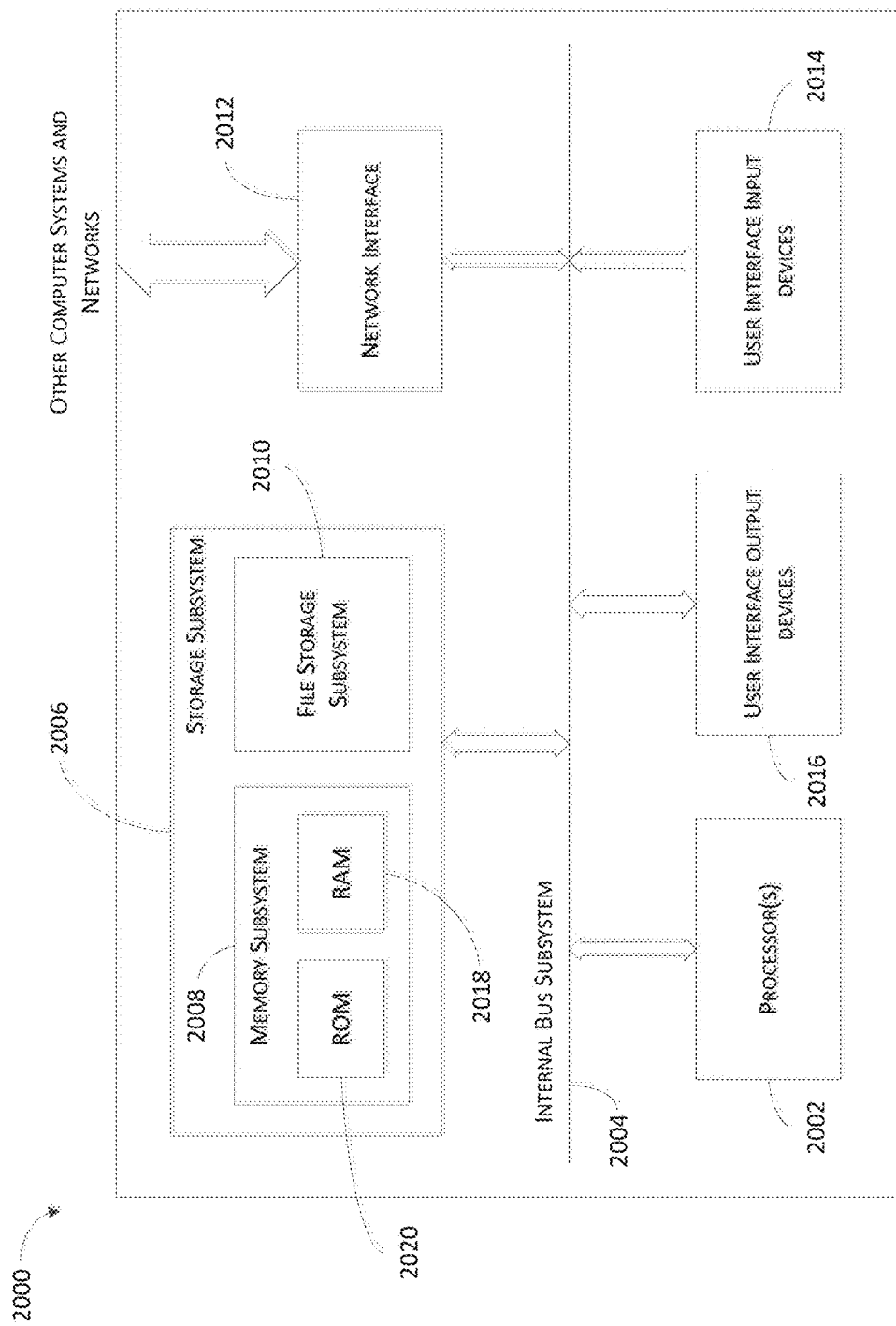
FIG. 20 is a simplified block diagram of computer system, according to certain embodiments.

FIG. 20 is a simplified block diagram of computer system 2000, according to certain embodiments. Computer system 2000 can be used to implement any of the host computer computing devices discussed above with respect to FIGS. 1-19. Computer system 2000 can include one or more processors 2002 that can communicate with a number of peripheral devices (e.g., input devices) via a bus subsystem 2004. These peripheral devices can include storage subsystem 2006 (comprising memory subsystem 2008 and file storage subsystem 2010), user interface input devices 2014, user interface output devices 2016, and a network interface subsystem 2012.

In some examples, internal bus subsystem 2004 can provide a mechanism for letting the various components and subsystems of computer system 2000 communicate with each other as intended. Although internal bus subsystem 2004 is shown schematically as a single bus, alternative embodiments of the bus subsystem can utilize multiple buses. Additionally, network interface subsystem 2012 can serve as an interface for communicating data between computer system 2000 and other computer systems or networks. Embodiments of network interface subsystem 2012 can include wired interfaces (e.g., Ethernet, CAN, RS232, RS485, etc.) or wireless interfaces (e.g., ZigBee, Wi-Fi, cellular, etc.).

In some cases, user interface input devices 2014 can include a keyboard, pointing devices (e.g., mouse, trackball, touchpad, etc.), a barcode scanner, a touch-screen incorporated into a display, audio input devices (e.g., voice recognition systems, microphones, etc.), Human Machine Interfaces (HMI) and other types of input devices. In general, use of the term "input device" is intended to include all possible types of devices and mechanisms for inputting information into computer system 2000. Additionally, user interface output devices 2016 can include a display subsystem, a printer, or non-visual displays such as audio output devices, etc. The display subsystem can be any known type of display device. In general, use of the term "output device" is intended to include all possible types of devices and mechanisms for outputting information from computer system 2000.

Storage subsystem 2006 can include memory subsystem 2008 and file/disk storage subsystem 2010. Subsystems 2008 and 2010 represent non-transitory computer-readable storage media that can store program code and/or data that provide the functionality of embodiments of the present disclosure (e.g., software 201-204). In some embodiments, memory subsystem 2008 can include a number of memories including main random access memory (RAM) 2018 for storage of instructions and data during program execution and read-only memory (ROM) 2020 in which fixed instructions may be stored. File storage subsystem 2010 can provide persistent (i.e., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 2000 is illustrative and not intended to limit embodiments of the present disclosure. Many other configurations having more or fewer components than system 2000 are possible.

The various embodiments further can be implemented in a wide variety of operating environments, which in some cases can include one or more user computers, computing devices or processing devices, which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially available protocols, such as TCP/IP, UDP, OSI, FTP, UPnP, NFS, CIFS, and the like. The network can be, for example, a local-area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers.

The server(s) also may be capable of executing programs or scripts in response to requests from user devices, such as by executing one or more applications that may be implemented as one or more scripts or programs written in any programming language, including but not limited to Java®, C, C# or C++, or any scripting language, such as Perl, Python or TCL, as well as combinations thereof. The server (s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device.

Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. The phrase "based on" should be understood to be open-ended, and not limiting in any way, and is intended to be interpreted or otherwise read as "based at least in part on," where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

What is claimed is:

1. A computer-implemented method comprising:
sending, by a first host computer communicatively paired with an input device, a broadcast over a network requesting a response from other host computers on the network that are also communicatively paired with the input device;
receiving, by the first host computer, a broadcasted response from a second host computer of the other host computers on the network indicating that the second host computer is communicatively paired with the input device;
establishing, by the first host computer, a communicative connection with the second host computer via the network and automatically reestablishing the connection with the second host computer when the second host computer disconnects and reconnects to the network; and in response to receiving an input signal from the input device that causes a cursor controlled by the input device to move to an edge of a display of the first host computer, where the input signal corresponds to a continued movement of the cursor beyond the edge of the display of the first host computer:

sending, by the first host computer to the input device, a control signal to switch the communicative pairing of the input device from the first host computer to the second host computer.

2. The computer-implemented method of claim 1 further comprising:

receiving, by the first host computer, a broadcasted response from a third host computer of the other host computers on the network indicating that the third host computer is communicatively paired with the input device; and establishing, by the first host computer, a communicative connection with the third host computer via the network and automatically reestablishing the connection with the third host computer when the third host computer disconnects and reconnects to the network.

3. The computer-implemented method of claim 2 wherein the control signal is a first control signal, and wherein in response to determining that the second host computer has disconnected from the network and that the cursor on the first host computer has moved to the edge of the display of the first host computer:

sending, by the first host computer to the input device, a second control signal to switch the communicative pairing of the input device from the first host computer to the third host computer.

4. The computer-implemented method of claim 1 wherein the control signal is a first control signal, and further in response to detecting that the cursor has moved to the edge of the display of the first host computer and that the input signal corresponds to continued movement of the cursor beyond the edge of the display of the first host computer, the method further comprises:

sending, by the first host computer to the second host computer, a second control signal causing a processor in the second host computer to move a second cursor on a display of the second host computer.

5. The computer-implemented method of claim 1 wherein the network is a local-area network (LAN).

6. The computer-implemented method of claim 1 wherein the network is a cloud-based network.

7. The computer-implemented method of claim 1 wherein the input device is communicatively paired to the first host computer or the second host computer via a wireless communications protocol including one of Bluetooth, Bluetooth LE, Infra-red (IR), ZigBee, Ultra Wideband, or RF.

8. A system comprising:
one or more processors; and
one or more non-transitory computer-readable storage mediums containing instructions configured to cause the one or more processors to perform operations including:

sending, by a first host computer communicatively paired with an input device, a broadcast over a network requesting a response from other host computers on the network that are also communicatively paired with the input device;

receiving, by the first host computer, a broadcasted response from a second host computer of the other host computers on the network indicating that the second host computer is communicatively paired with the input device;

establishing, by the first host computer, a communicative connection with the second host computer via the network and automatically reestablishing the connection with the second host computer when the second host computer disconnects and reconnects to the network; and in response to receiving an input signal from the input device that causes a cursor controlled by the input device to move to an edge of a display of the first host computer, where the input signal corresponds to a continued movement of the cursor beyond the edge of the display of the first host computer:

sending, by the first host computer to the input device, a control signal to switch the communicative pairing of the input device from the first host computer to the second host computer.

9. The system of claim 8 wherein the one or more non-transitory computer-readable storage mediums further contain instructions to cause the one or more processors to perform operations including:

receiving, by the first host computer, a broadcasted response from a third host computer of the other host computers on the network indicating that the third host computer is communicatively paired with the input device; and establishing, by the first host computer, a communicative connection with the third host computer via the network and automatically reestablishing the connection with the third host computer when the third host computer disconnects and reconnects to the network.

10. The system of claim 9 wherein the control signal is a first control signal, and wherein the one or more non-transitory computer readable storage mediums further contain instructions to cause the one or more processors to perform operations including:

in response to determining that the second host computer has disconnected from the network and that the cursor on the first host computer has moved to the edge of the display of the first host computer:

sending, by the first host computer to the input device, a second control signal to switch the communicative pairing of the input device from the first host computer to the third host computer.

11. The system of claim 8 wherein the control signal is a first control signal, and wherein the one or more non-transitory computer-readable storage mediums further contain instructions to cause the one or more processors to perform operations including:

further in response to detecting that the cursor has moved to the edge of the display of the first host computer and that the input signal corresponds to continued movement of the cursor beyond the edge of the display of the first host computer:

sending, by the first host computer to the second host computer, a second control signal causing a processor in the second host computer to move a second cursor on a display of the second host computer.

12. The system of claim 8 wherein the network is a LAN.

13. The system of claim 8 wherein the network is a cloud-based network.

14. The system of claim 8 wherein the input device is communicatively paired to the first host computer or the second host computer via a wireless communications protocol including one of Bluetooth, Bluetooth LE, IR, ZigBee, Ultra Wideband, or RF.

15. A non-transitory computer-program product tangibly embodied in a machine-readable non-transitory storage medium including instructions to cause a processor to:
    send, by a first host computer communicatively paired with an input device, a broadcast over a network requesting a response from other host computers on the network that are also communicatively paired with the input device;
    receive, by the first host computer, a broadcasted response from a second host computer of the other host computers on the network indicating that the second host computer is communicatively paired with the input device;
    establish, by the first host computer, a communicative connection with the second host computer via the network and automatically reestablish the connection with the second host computer when the second host computer disconnects and reconnects to the network; and
    in response to receiving an input signal from the input device that causes a cursor controlled by the input device to move to an edge of a display of the first host computer, where the input signal corresponds to a continued movement of the cursor beyond the edge of the display of the first host computer:
    send, by the first host computer to the input device, a control signal to switch the communicative pairing of the input device from the first host computer to the second host computer.

16. The computer-program product of claim 15 further including instructions to cause a processor to:
    receive, by the first host computer, a broadcasted response from a third host computer of the other host computers on the network indicating that the third host computer is communicatively paired with the input device; and
    establish, by the first host computer, a communicative connection with the third host computer via the network and automatically reestablishing the connection with the third host computer when the third host computer disconnects and reconnects to the network.

17. The computer-program product of claim 16 wherein the control signal is a first control signal, and further including instructions to cause a processor to:
    in response to determining that the second host computer has disconnected from the network and that the cursor on the first host computer has moved to the edge of the display of the first host computer:
    send, by the first host computer to the input device, a second control signal to switch the communicative pairing of the input device from the first host computer to the third host computer.

18. The computer-program product of claim 15 wherein the control signal is a first control signal, and wherein in response to determining that the second host computer disconnected from the network, and detecting that the cursor on the first host computer has moved to the edge of the display, the instructions further cause a processor to:
    send, by the first host computer to the input device, a second control signal to switch the communicative pairing of the input device from the first host computer to the third host computer.

19. The computer-program product of claim 15 wherein the network is a LAN.

20. The computer-program product of claim 15 wherein the network is a cloud-based network.

* * * * *